US012639895B2

(12) United States Patent
Xiao et al.

(10) Patent No.: US 12,639,895 B2
(45) Date of Patent: May 26, 2026

(54) AUGMENTED IMAGE GENERATION SYSTEM

(71) Applicant: VALEO COMFORT AND DRIVING ASSISTANCE, Créteil (FR)

(72) Inventors: Xinhua Xiao, Troy, MI (US); Peter Groth, Troy, MI (US)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 175 days.

(21) Appl. No.: 18/405,346

(22) Filed: Jan. 5, 2024

(65) Prior Publication Data

US 2025/0225736 A1     Jul. 10, 2025

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/70* (2017.01); *G06T 15/80* (2013.01); *G06T 19/20* (2013.01);
(Continued)

(58) Field of Classification Search
CPC ......... G06T 19/006; G06T 7/70; G06T 15/80; G06T 19/20; G06T 2200/24;
(Continued)

(56) References Cited

U.S. PATENT DOCUMENTS

2017/0330034 A1   11/2017   Wang et al.
2018/0261186 A1    9/2018   Watson et al.
(Continued)

FOREIGN PATENT DOCUMENTS

CN     216960044 U     7/2022
EP      3786854 A1     3/2021
TW     201604759 A     2/2016

OTHER PUBLICATIONS

Max Coenen et al. "Pose Estimation and 3D Reconstruction of Vehicles from Stereo-Images Using a Subcategory-Aware Shape Prior" Institute of Photogrammetry and GeoInformation, Leibniz Universitat Hannover, Germany (25 pages).
(Continued)

*Primary Examiner* — Chong Wu
(74) *Attorney, Agent, or Firm* — Osha Bergman Watanabe & Burton LLP

(57)     ABSTRACT

A system for rendering an augmented image frame includes a sensor, an interface, a memory, a processor, and a display. The sensor captures an environment image of an external environment of a vehicle that includes a physical object. The interface receives an augmentation class to be applied to the environment image frame. The memory stores an augmentation engine that causes the processor to receive the environment image frame and the augmentation class. The augmentation engine further causes the processor to determine an identity and location of the physical object, and retrieve a digital object associated with the physical object and the augmentation class. Subsequently, an augmented image frame is rendered including the digital object disposed at the location of the physical object in the external environment. Finally, the display depicts the augmented image frame to present the user with an aesthetically appealing synthetic view of the external environment.

20 Claims, 9 Drawing Sheets

(51) Int. Cl.

| | | |
|---|---|---|
| *G06T 15/80* | (2011.01) | |
| *G06T 19/20* | (2011.01) | |
| *G06V 10/94* | (2022.01) | |
| *G06V 20/58* | (2022.01) | |

(52) U.S. Cl.

CPC ............ *G06V 10/945* (2022.01); *G06V 20/58* (2022.01); *G06T 2200/24* (2013.01); *G06T 2207/20092* (2013.01); *G06T 2207/30252* (2013.01); *G06T 2219/004* (2013.01)

(58) Field of Classification Search

CPC . G06T 2207/20092; G06T 2207/30252; G06T 2219/004; G06T 2219/2024; G06V 10/945; G06V 20/58

See application file for complete search history.

(56) References Cited

U.S. PATENT DOCUMENTS

| | | | | |
|---|---|---|---|---|
| 2021/0134248 | A1 | 5/2021 | Wan et al. | |
| 2022/0101593 | A1* | 3/2022 | Rockel | A63F 13/655 |
| 2023/0296394 | A1* | 9/2023 | Lee | G01C 21/365 |
| | | | | 701/436 |
| 2023/0306693 | A1 | 9/2023 | Gerrese et al. | |
| 2024/0311498 | A1* | 9/2024 | Millberg | G06T 19/006 |
| 2024/0371110 | A1* | 11/2024 | Cartwright | G06F 3/04845 |
| 2024/0394944 | A1* | 11/2024 | Liu | G06T 7/20 |

OTHER PUBLICATIONS

Qing Rao et al. "In-Vehicle Object-level 3D Reconstruction of Traffic Scenes" IEEE Transactions on Intelligent Transportation Systems, vol. 22, Issue: 12, Dec. 2021, pp. 7747-7759, DOI: 10.1109/TITS.2020.3008080 (13 pages).

Sihyun Yu et al. "Generating Videos with Dynamics-Aware Implicit Generative Adversarial Networks" ICLR 2022 (25 pages).

Meta "Meta and BMW: Taking AR and VR Experiences on the Road" Meta Website, May 17, 2023, URL: https://about.fb.com/news/2023/05/meta-bmw-ar-vr-experiences/ (8 pages).

Sahil Pawar, "BMW Launches Its Latest Concept Car BMW I Vision Dee Inspired By Metaverse", Analytics Drift, Jan. 6, 2023, URL: https://analyticsdrift.com/bmw-launches-its-latest-concept-car-bmw-i-vision-dee-inspired-by-metaverse/ (2 pages).

International Search Report issued in corresponding International Application No. PCT/US2024/060317 mailed Apr. 2, 2025 (4 pages).

Written Opinion issued in corresponding International Application No. PCT/US2024/060317 mailed Apr. 2, 2025 (4 pages).

Chuang, et al. Deep learning-based panoptic segmentation: Recent advances and perspectives. IET Image Process, 17, 2807-2828 (2023). https://dol.org/10.1049/lpr2.12853 (22 pages).

UniMax; ASUS Group. (Feb. 8, 2022). UniMax Introduces World's First MAVE AR HUD for Automotive. PR Newswire. https://prnewswire.com/news-releases/unimax-introduces-worlds-first-mave-ar-hud-for-automotive-301467167.html (4 pages).

* cited by examiner

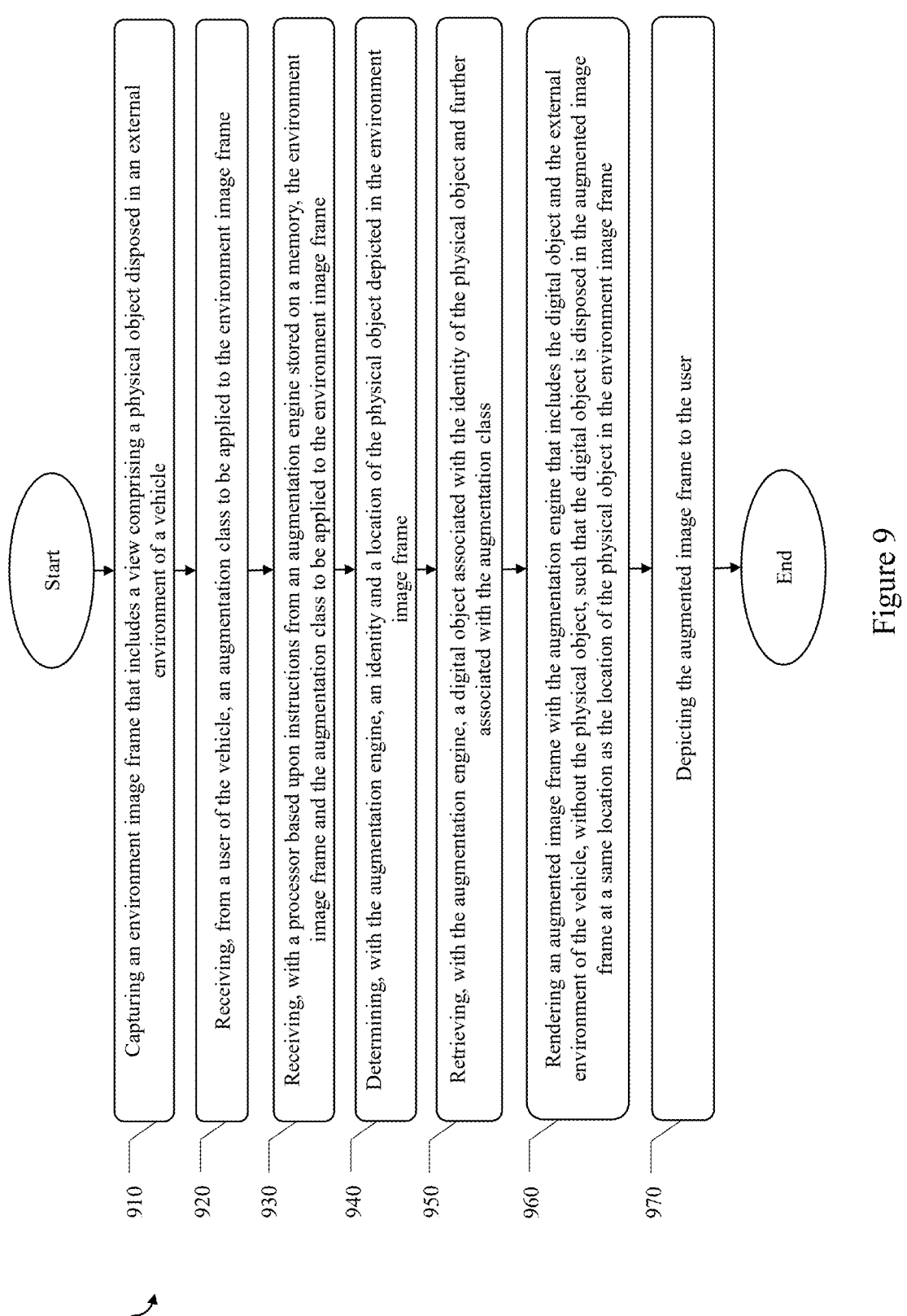

Start

Capturing an environment image frame that includes a view comprising a physical object disposed in an external environment of a vehicle

910

Receiving, from a user of the vehicle, an augmentation class to be applied to the environment image frame

920

Receiving, with a processor based upon instructions from an augmentation engine stored on a memory, the environment image frame and the augmentation class to be applied to the environment image frame

930

Determining, with the augmentation engine, an identity and a location of the physical object depicted in the environment image frame

940

Retrieving, with the augmentation engine, a digital object associated with the identity of the physical object and further associated with the augmentation class

950

Rendering an augmented image frame with the augmentation engine that includes the digital object and the external environment of the vehicle, without the physical object, such that the digital object is disposed in the augmented image frame at a same location as the location of the physical object in the environment image frame

960

Depicting the augmented image frame to the user

970

End

AUGMENTED IMAGE GENERATION SYSTEM

BACKGROUND

One of the foremost areas of progress in modern computing resides in the development of Augmented Reality (AR) technology. In particular, AR technology allows for digital content such as images, text, or virtual objects to be displayed in the physical world. The digital content may be displayed in a video feed appearing on a screen, where the digital content is superimposed on the video feed such that it appears that the digital content is part of the video feed, and thus the physical world itself. For example, AR has provided numerous advances in the field of video gameplay, such that a user may use a device such as a smartphone or tablet to play a game involving the display of both real world and digitized objects. Furthermore, a video feed may be displayed on any device capable of displaying an image frame, such as a laptop, smartphone, tablet, or an equivalent device including a suitable display.

In addition to the rise of AR technology, the capability of motor vehicles to detect and communicate about their local environment has also increased. As one example of this, modern vehicles are typically provided with a suite of sensors and displays, where the sensors allow the vehicle to determine its proximity to various real world objects and the displays relay vehicle information to a driver. Furthermore, it is becoming increasingly common to include a wireless networking connection (i.e., Wi-Fi, a cellular network, Vehicle-to-Vehicle (V2V) networks, etc.) in a vehicle, and to transmit data to and from the driving vehicle and other neighboring vehicles with the use of Road Side Units (RSUs). In this way, it is possible to combine these two technologies (i.e., AR technology and vehicle computing capabilities), in order to provide a driver with digital content while the driver is driving the motor vehicle. However, the combination of these two technologies necessitates a robust system to effectuate a well-synchronized and aesthetically pleasing user experience, as any information must be presented to a driver in a safe manner to avoid unnecessary distractions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system for rendering an augmented image frame includes a sensor, an interface, a memory, a processor, and a display. The sensor captures an environment image frame that includes a view with a physical object located in an external environment of a vehicle. The interface receives, from a user of the vehicle, an augmentation class to be applied to the environment image frame. The memory stores an augmentation engine comprising computer readable code that is executed by the processor. The computer readable code causes the processor to receive the environment image frame and the augmentation class to be applied to the environment image frame. The processor determines an identity and a location of the physical object disposed in the environment image frame, and retrieves a digital object associated with the identity of the physical object and further associated with the augmentation class. Subsequently, the processor renders the augmented image frame such that the augmented image frame includes the digital object and the external environment of the vehicle, without the physical object. In this way, the digital object is disposed in the augmented image frame at a same location as the location of the physical object in the environment image frame. Finally, the display depicts the augmented image frame to the user to present the user with an aesthetically appealing synthetic view of the external environment.

A method for generating an augmented image frame involves capturing an environment image frame that includes a view with a physical object disposed in an external environment of a vehicle. An augmentation class to be applied to the environment image frame is received from a user of the vehicle, and an augmentation engine including computer readable code is stored on a memory. Subsequently, the environment image frame and the augmentation class to be applied thereto are received by executing the computer readable code forming the augmentation engine. The augmentation engine determines an identity and a location of the physical object disposed in the environment image frame, and retrieves a digital object associated with the identity of the physical object and further associated with the augmentation class. Once the identity and location of the physical object is determined, the augmentation engine renders the augmented image frame such that the augmented image frame includes the digital object and the external environment of the vehicle, without the physical object. In this way, the digital object is disposed in the augmented image frame at a same location as the location of the physical object in the environment image frame. Finally, the augmented image frame is depicted to the user to present the user with an aesthetically appealing synthetic view of the external environment.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 9 depicts a flowchart of a process for creating an augmented image frame in accordance with one or more embodiments disclosed herein.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention as described herein are directed towards a system for creating an augmented image frame using data captured from an external environment of a motor vehicle. The augmented image frame may be displayed on one or more different devices based upon the location of the user of the system and their role in controlling the motor vehicle. For example, if the user of the system is a driver of the motor vehicle, the augmented image frame may be displayed on a windshield or Head Up Display (HUD) of the motor vehicle. Alternatively, if the user of the system is a passenger of the vehicle, or is not located in the vehicle, the augmented image frame may be displayed on an auxiliary user device such as a smartphone or computer possessed by the user. By forming a series of augmented image frames that are successively presented to the user, the system creates an augmented video feed for the user to view. In addition, by varying the content of the augmented image frame the system is capable of creating multiple different themes of augmented image frames, where the theme is selected according to a user preference. Thus, overall, the system is configured to present an augmented video feed to a user that corresponds to both the local environment of a motor vehicle and the user's preferences of the augmented content.

Figure 1:
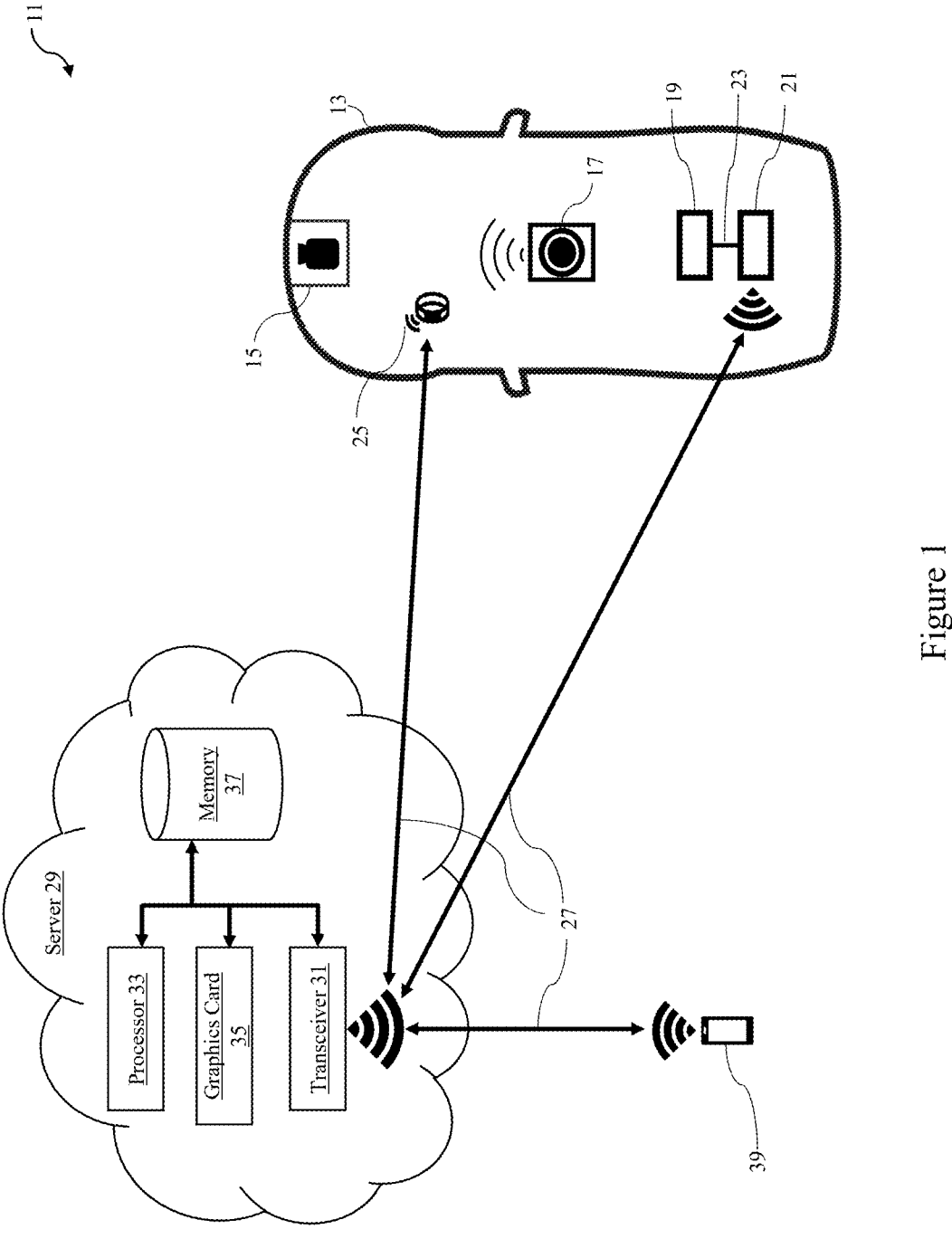
FIG. 1 shows a system in accordance with one or more embodiments disclosed herein.

FIG. 1 depicts an example of a system 11 in accordance with one or more embodiments disclosed herein. As depicted in FIG. 1, the system 11 includes a vehicle 13, a server 29, and a mobile device 39. The vehicle 13 may be a passenger car, a bus, a transportation vehicle such as a semi-truck, or any other type of vehicle 13. As shown in FIG. 1, a vehicle 13 includes a first sensor 15, a second sensor 17, an infotainment module 19 and an Electronic Control Unit (ECU) 21. The infotainment module 19 may be embodied, for example, as a display such as a Liquid Crystal Display (LCD), Organic Light Emitting Diode (OLED), or equivalent display that presents information to a user. The infotainment module 19 may further include a touchscreen to allow a driver of the vehicle 13 to control various operating parameters of the infotainment module 19 and the vehicle 13 itself. Otherwise, the infotainment module 19 may be controlled by way of one or more dials, knobs, switches, buttons, or equivalent devices for receiving user input. Further, in one or more embodiments, interface devices (e.g., a mouse, wired and wireless gaming controllers, mobile devices, etc.) may be connected to the infotainment module 19 via wired or wireless connections in order to transmit user input to the infotainment module 19.

The first sensor 15 is depicted as being a camera in FIG. 1, while the second sensor 17 is depicted as being a Light Detection and Ranging (LiDAR) unit. Thus, the first sensor 15 is configured to capture an environment image frame that includes a view of a physical object located in the external environment of the vehicle 13 (e.g., FIG. 2A), while the second sensor 17 emits and receives a laser, for example, to capture data related to the position of a physical object in relation to the vehicle 13. However, the first sensor 15 and/or the second sensor 17 may alternatively be embodied as other sensing or imaging units, such as a radar sensor, an ultrasonic sensor, an infrared camera, or equivalent devices and sensors. Furthermore, the first sensor 15 may take the form, for example, of a mono-camera or a stereo camera, and may capture images in the visible and/or infrared light wavelengths. As described below, the first sensor 15 and the second sensor 17 serve to capture a video feed that includes a view of the external environment of the motor vehicle. The first sensor 15 may be a same type of sensor as a second sensor 17, or a different type of sensor to capture multiple forms of data related to the external environment.

Additionally, the vehicle 13 further includes a plurality of sensors (referred to as environment sensors 73 herein) configured to gather information associated with the movements of the vehicle 13 through the environment. For example, the vehicle 13 may further include a vehicle speed sensor or Global Positioning Sensor (GPS) unit to determine the forward or reverse velocity of the vehicle 13 as the vehicle 13 is traversing the external environment. Such a GPS sensor (e.g., FIG. 4) may employ trilateration, triangulation, or similar procedures to determine the position of the vehicle 13. The vehicle 13 may further be equipped with an Inertial Movement Unit (IMU) (e.g., FIG. 4), a yaw rate sensor, or an accelerometer to facilitate the collection of angular movement data related to the vehicle 13.

Thus, as a whole, the environment sensors 73 serve to provide orientation data related to the position of the vehicle 13 in the external environment. In conjunction with the first sensor 15 and the second sensor 17, environment sensors 73 of the vehicle 13 are configured to capture environmental data of the vehicle 13. Accordingly, the phrase "environmental data" as described herein relates to data such as an environment image frame or a distance of one or more physical structures in the vicinity of the vehicle 13. The term environmental data further encompasses data captured by the environment sensors 73 described above, such that the environment data encompasses data related to the movement of the vehicle 13. Finally, and as further described below, environmental data also includes data captured by a device of a user, such as a heart rate of a user captured by a wearable device 25 located within the vehicle 13 and belonging to the user.

Figure 4:
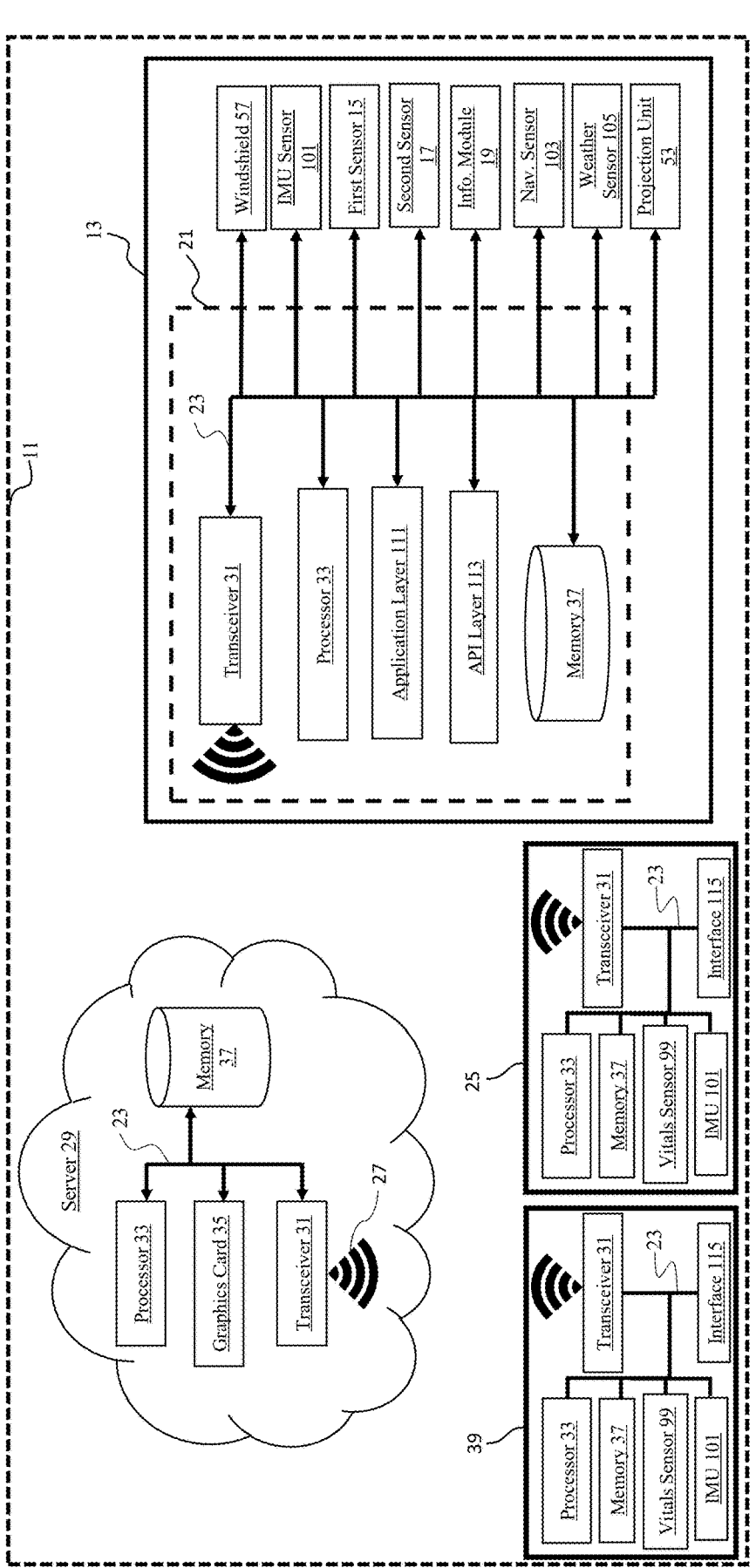
FIG. 4 depicts a system in accordance with one or more embodiments disclosed herein.

The structure of the ECU 21 is further detailed in relation to FIG. 4, but generally includes one or more processors, integrated circuits, microprocessors, or equivalent computing structures, which are further coupled to a transceiver (e.g., FIG. 4). The ECU 21 is thus configured to execute a series of instructions, formed as computer readable code, that allow the ECU 21 to receive and interpret data from a plurality of sources. The computer readable code may, for example, be written in a language such as C++, C#, Java, MATLAB, or equivalent computing languages suitable for motor vehicle control instructions. Through the use of the computer readable code, the transceiver (e.g., FIG. 4) of the ECU 21, and the data bus 23, the ECU 21 is configured to receive the environmental data (e.g., FIG. 4) from the first sensor 15 and the second sensor 17, and transmits the environmental data to a server 29.

The aforementioned components of the vehicle 13 are interconnected through the use of a data bus 23, which is a series of wires, optical fibers, printed circuits, or equivalent structures for transmitting signals between computing devices. Furthermore, although described above as a physical connection, the data bus 23 may alternatively be embodied as a virtual network connection between computing devices, such as Wi-Fi, Bluetooth, Zigbee, Long-Term Evolution (LTE), 5th Generation (5G), or other equivalent forms of networking communication. Thus, the data bus 23 forms one or more transmitter(s) and receiver(s) between the various components described herein.

In order to process environmental data captured by the first sensor 15, the second sensor 17, and the various other sensors included in the environment sensors 73, the vehicle 13 transmits data to a server 29. Data is transmitted from the ECU 21 of the vehicle 13 by way of a transceiver (e.g., FIG. 4) that forms a wireless data connection 27 with the server 29. To this end, the wireless data connection 27 may be embodied as a cellular data connection (e.g., 4G, 4G LTE, 5G, and contemplated future cellular data connections such as 6G). Alternatively, the wireless data connection 27 may include forms of data transmission including Bluetooth, Wi-Fi, Wi-Max, Vehicle-to-Vehicle (V2V), Vehicle-to-Everything (V2X), satellite data transmission, or equivalent data transmission protocols.

Continuing with FIG. 1, the server 29 includes a transceiver 31 configured to receive the environmental data from the ECU 21 of the vehicle 13. As described herein, a "transceiver" refers to a device that performs both data transmission and data reception processes, such that the transceiver encompasses the functions of a transmitter and a receiver in a single package. In this way, the transceiver 31 includes an antenna (such as a monitoring photodiode), and a light source such as an LED, for example. Alternatively, the transceiver 31 may be split into a transmitter and receiver, where the receiver serves to receive the environmental data from the vehicle 13.

As described in relation to FIGS. 2 and 3, below, the server 29 performs processing on the environmental data to generate an augmented image frame for the vehicle 13. Thus, the server 29 includes components that interpret the environmental data, and create an augmented image frame according to a user's specification. Detailed examples of an augmented image frame are further described below, and include replacing a physical object captured in the environment image frame captured by the first sensor 15 with a digital object belonging to an augmentation class selected by the user. To perform the augmentation functions, the server 29 includes a processor 33, a graphics card 35, and a memory 37.

The processor 33 is formed by one or more processors, integrated circuits, microprocessors, or equivalent computing structures that serve to execute computer readable instructions stored on the memory 37. Thus, the memory 37 includes a non-transitory storage medium such as flash memory, Random Access Memory (RAM), a Hard Disk Drive (HDD), a solid state drive (SSD), a combination thereof, or equivalent. Similar to the processor 33, the graphics card 35 includes a processor, a series of processors, an integrated circuit, or a combination thereof that serves to perform image processing functions as described herein.

Collectively, components of the server 29 serve to form an augmented image frame based upon environmental data captured by the environment sensors 73, as well as an augmentation image class selected by the user on the infotainment module 19. To this end, an augmented image frame class represents a unique cinematic theme that is used to determine a digital object to replace the physical object depicted in an environment image frame captured by the first sensor 15. Examples of augmentation classes as described further below include an "underwater" augmentation class, a "watercolor" augmentation class, and a "metaverse" augmentation class. However, the augmentation classes may further include other cinematic themes not described in detail herein, such as an "outer space" or "rainforest" augmentation class. Furthermore, additional augmentation classes may be downloaded to the server 29 by way of a wireless data connection 27 (i.e., an internet data connection) to the server 29 (e.g., by way of the transceiver 31), such that the server 29 is configured to receive additional new augmentation classes.

Finally, the system 11 includes multiple end user devices that serve to present information to the user and to further collect additional environmental data. More specifically, the system 11 includes a wearable device 25 and a mobile device 39. The wearable device 25 is embodied as a smartwatch, for example, that is configured to receive vitals data from a user of the vehicle 13. The vitals data include circulatory data (i.e., a pulse, blood pressure, or other metric associated with a user's heartbeat), and optionally includes respiratory data (i.e., a respiration rate, oxygen saturation, or similar metric) associated with the user. On the other hand, the mobile device 39 includes a smartphone, a tablet, a laptop, or similar computing device associated with the user or with another person desiring to view an augmented image frame produced by the server 29. In this way, the server 29 is further configured to receive vitals data of the user, and is further configured to output data, such as the augmented image frame, to multiple devices such as the infotainment module 19 and the mobile device 39.

Figures 2A, 2B:
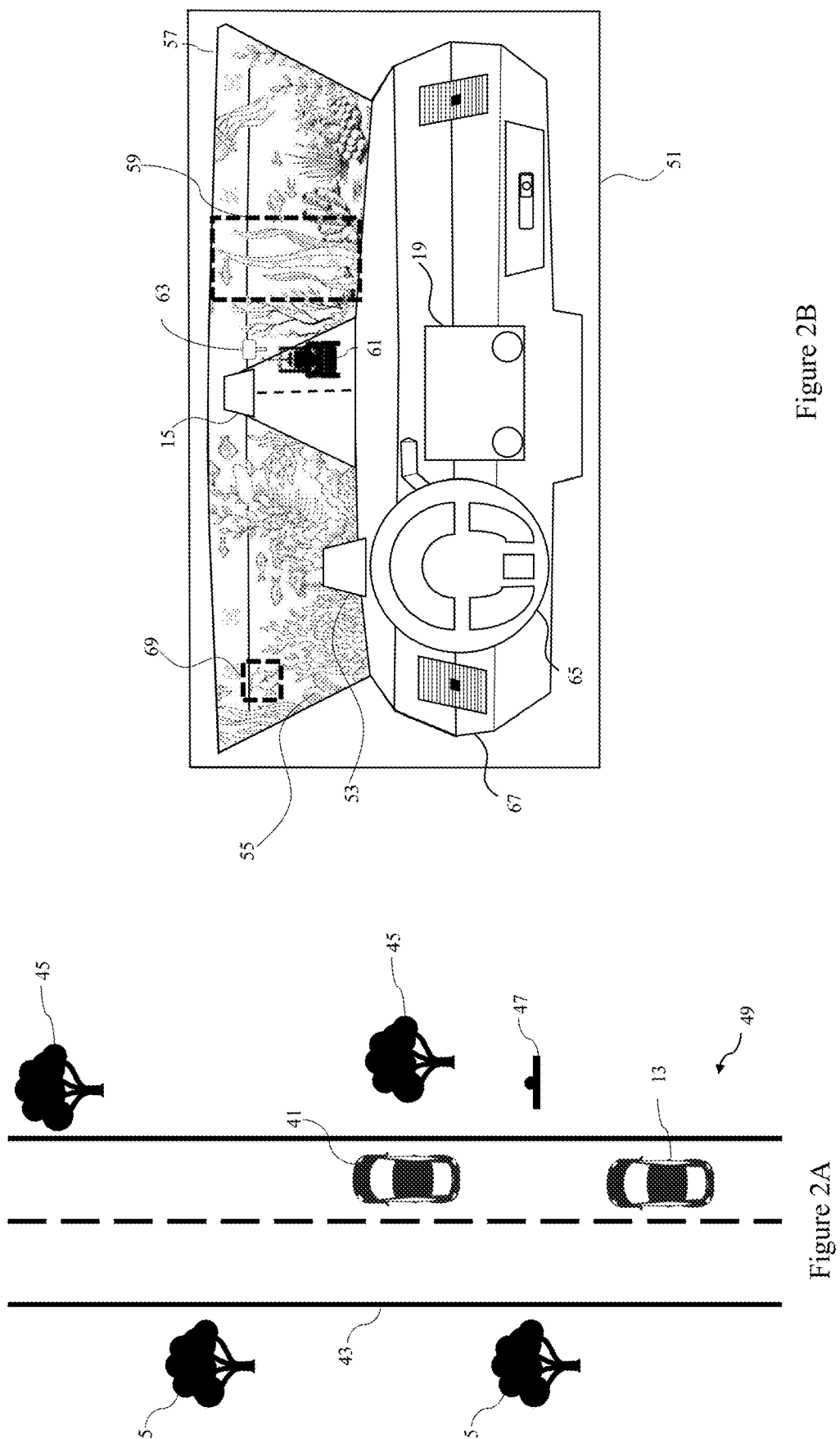
FIGS. 2A and 2B depict a motor vehicle traversing an environment and a cabin of the motor vehicle, respectively, in accordance with one or more embodiments disclosed herein.

Turning to FIGS. 2A and 2B, FIG. 2A depicts an external environment 49 of a vehicle 13, while FIG. 2B depicts a cabin 51 that forms the interior of the vehicle 13. As shown in FIG. 2A, a vehicle 13 follows a traffic vehicle 41 on a road 43, and is surrounded by multiple trees that form physical scenery 45 of the external environment 49. The external environment 49 further includes a sign 47, which presents travel information to a user. Travel information may include regulatory information, such as a speed limit governing the rate of travel on the road 43, or advisory information, such as if the road 43 curves ahead, for example. As the vehicle 13 is traversing the external environment 49, the first sensor 15 and the second sensor 17 (if equipped) capture environmental data related to the identity and location of the traffic vehicle 41, the physical scenery 45, and the sign 47. In this case, the environmental data includes an environment image frame capturing one or more physical objects including the traffic vehicle 41, the physical scenery 45, and the sign 47, and may further include the distance between the vehicle 13 and the physical object. The environmental data is transmitted back to the server 29 by way of the wireless data connection 27, which proceeds to form an augmented image frame based upon the environmental data. This process is further detailed in relation to FIG. 3, and the output of this process (i.e., the augmented image frame 55) is depicted in FIG. 2B.

To this end, FIG. 2B depicts a cabin 51 of a vehicle 13. The cabin 51 includes components used to control the movement of the vehicle 13 in the external environment 49, such as a steering wheel 65, and further includes comfort and safety equipment such as a dashboard 67 storing an airbag (not shown). In addition, the cabin 51 may include sensory devices, such as the first sensor 15, that allow the vehicle 13 to receive data of its external environment 49. The cabin 51 also includes an infotainment module 19, which presents information to the user as the user is driving through the external environment 49 and further provides an interface for the user to select various comfort settings of the vehicle 13.

Furthermore, the cabin 51 includes a projection unit 53, which is a display device that projects an augmented image frame 55 onto a windshield 57 of the vehicle 13. In this case, the projection unit 53 functions as an optical collimator that produces parallel light beams to display the augmented image frame 55 on the windshield 57. Thus, the windshield 57 functions as a combiner for the augmented image frame, and may be embodied as a polarized windshield 57 or include an at least partially translucent polarized substrate that serves as a display surface for the augmented image frame 55 projected by the projection unit 53. Alternatively, the projection unit 53 and windshield 57 may be replaced with a windshield 57 alone that includes a display surface, such as an OLED layer, that presents the augmented image frame 55 to the user.

As shown in FIG. 2B, the augmentation class is selected by a user of the system 11 to be an "underwater" theme. The selection of the augmentation class is further described in relation to FIG. 8, and is enabled by a dropdown menu (e.g., FIG. 8) presented to a user via the infotainment module 19 located in the cabin 51. Each augmentation class comprises a plurality of digitized objects associated with physical counterparts typically found while driving, and further associated with the augmentation class itself. For example, each augmentation class comprises at least one instance of a "sign" as a digitized object, and further comprises at least one instance of a "traffic vehicle" as a digitized object, as both of these objects are typically seen while driving through an environment. However, a physical object may be associated with multiple digitized counterparts, where each digitized counterpart belongs to a different augmentation class. For example, a physical sign 47 may have a first digital counterpart belonging to an "outer space" augmentation class that is visually distinct from a second digital counterpart belonging to an "underwater" augmentation class.

Continuing with FIG. 2B, based upon the user selecting an "underwater" theme, when the server 29 receives the environmental data from the wireless data connection 27, the server 29 searches its memory 37 for digital objects associated with the identity of the physical scenery 45, the traffic vehicle 41, and the sign 47, and further associated with an "underwater" augmentation class. In this case, the memory 37 returns digital scenery 59, a digital traffic vehicle 61, and a digital sign 63, which are digitized thematic counterparts of the physical scenery 45, the traffic vehicle 41, and the sign 47, respectively.

For example, the digital scenery 59 is depicted as being flora local to a tropical ocean bay, and includes objects such as a kelp frond and seagrass, for example. Similarly, the digital traffic vehicle 61 is depicted as being a shipping vessel with wheels as a cinematic representation of an underwater vehicle. Finally, because the sign 47 may include important information relevant to the user as they are driving, only the structure of the sign 47, and not the information included therein, is digitally replaced. As one example, a sign 47 may be formed of a metal sign attached to a square channel, whereas the digital sign 63 is depicted as a weathered wooden sign to present a more aesthetically pleasing information format to the user. In this case, the weathered wooden sign forming the digital sign 63 will still include the same information as that of the sign 47, so as not to interrupt or otherwise influence the user's intended actions.

Once the server 29 has determined which digital objects are counterparts of physical objects of the external environment 49, the server 29 begins to form the augmented image frame 55 by replacing the physical objects with their digital counterparts in the augmented image frame 55. This process is further described in relation to FIG. 3. To further increase the immersivity of the augmented image frame 55, the server 29 is configured to introduce auxiliary scenery 69 into the augmented image frame 55. The type of auxiliary scenery 69 introduced into the augmented image frame 55 depends on the augmentation class, and includes non-disruptive objects that are placed in the augmented image frame 55 at locations that are not occupied by physical objects or their digital counterparts. For example, because FIG. 2B illustrates an "underwater" augmentation class, the auxiliary scenery 69 incudes objects such as fish, bubbles, discarded anchors, or other objects that may be found on the ocean floor. Accordingly, as a whole, the system 11 is configured to capture environmental data of a sign 47 of the vehicle 13, and present an augmented image frame 55 to the user in the cabin 51 that is a cinematic depiction of the external environment 49.

Figure 3:
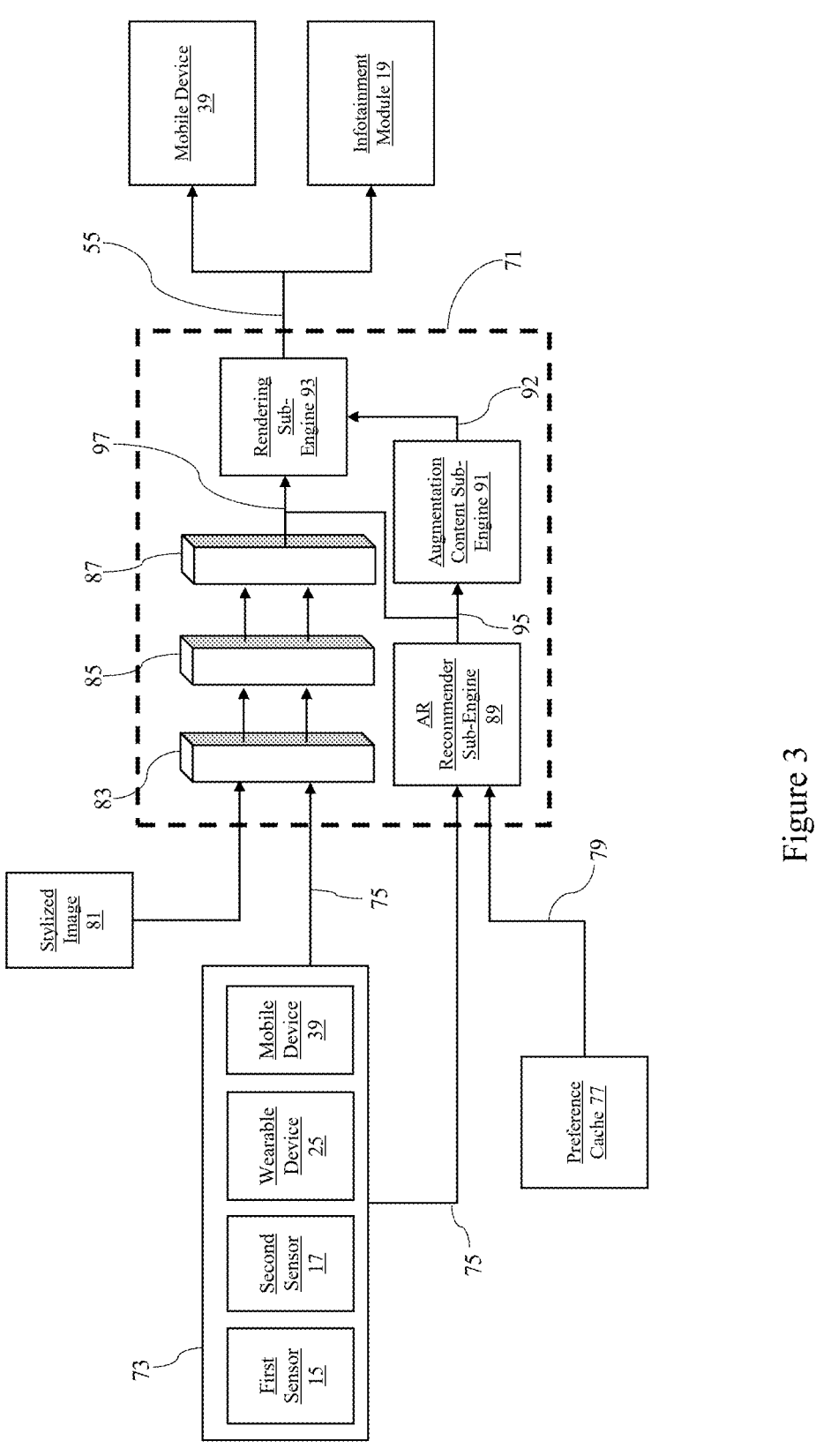
FIG. 3 depicts a flowchart of a system in accordance with one or more embodiments disclosed herein.

Turning to FIG. 3, FIG. 3 depicts an augmentation engine 71 used to generate an augmented image frame 55. Consistent with the above descriptions of FIGS. 1, 2A, and 2B, the augmentation engine 71 may operate on or in conjunction with devices of both the server 29 and the vehicle 13. For example, the augmentation engine 71 itself may be hosted on the server 29, and receive images from the first sensor 15 of the vehicle 13 as its input by way of the wireless data connection 27. Alternatively, the entire augmented image frame 55 may be hosted on the vehicle 13, such that the augmented image frame 55 is generated solely using components and sensors of the vehicle 13.

As shown in FIG. 3, the augmentation engine 71 receives multiple forms of data as its input, which provides the augmentation engine 71 with a holistic view of the external environment 49. The multiple forms of data are represented in FIG. 3 as environment sensors 73 that output environmental data 75, where the environment sensors 73 includes the first sensor 15, the second sensor 17, the wearable device 25, and the mobile device 39. As such, the environmental data 75 is data captured by the environment sensors 73, and includes information that relates to physical objects located in the external environment 49, as well as data related to the user itself, such as vitals data. The augmentation engine 71 further receives user preference data 79 from a preference cache 77, which includes data such as an augmentation class selected by the user, as well as options related thereto. Although discussed further in relation to FIGS. 7 and 8, the related options include a selection of whether auxiliary scenery 69 or sponsored content are to be included in the augmented image frame 55, among other options.

The final input of the augmentation engine 71 is a stylized image 81 that is associated with the selected augmentation class. For example, in the case described in FIG. 2B where an "underwater" augmentation class is used to form the augmented image frame, the input image is an image of an underwater view that serves as the creative basis for the augmented image frame 55. Alternatively, and as further discussed below, the stylized image 81 may be replaced by a text description of the environment, and the augmentation engine 71 uses the text description as the basis for creating the augmented image frame 55.

As discussed further below, the augmentation engine 71 performs object detection processes to extract and identify portions of the stylized image 81, which form the digitized objects described above. For example, if the stylized image 81 includes underwater flora, the augmentation engine 71 extracts the underwater flora from the stylized image 81, and labels the extracted objects as "flora" related to the "underwater" augmentation class. In this way, the stylized image 81 is used to further modify the augmented image frame 55 according to a user's preference by providing digital objects that a user wishes to be included in the augmented image frame 55 to the augmentation engine 71.

As depicted in FIG. 3, the augmentation engine 71 itself is formed of a plurality of layers and various sub-engines. More specifically, the augmentation engine 71 includes an input layer 83, one or more hidden layers 85, and an output layer 87. The augmentation engine 71 further includes an Augmented Reality (AR) recommender sub-engine 89, an augmentation content sub-engine 91, and a rendering sub-engine 93. Thus, as a whole, the augmentation engine 71 is formed as a Neural Network that utilizes deep learning processes to create the augmented image frame. Collectively, the components of the augmentation engine 71 serve to transform the environmental data 75, the user preference data 79, and the stylized image 81 (i.e., the inputs of the augmentation engine 71) into an augmented image frame 55 to be displayed to the user. As described above, the augmented image frame may be presented to a mobile device 39 that belongs to the user of the system 11 or a person who wishes to be apprised of the traveling status of the vehicle 13 or view the augmented image frame 55 itself. Alternatively, the augmented image frame 55 may be presented on an infotainment module 19 of the vehicle 13, such that a user of the system 11 and/or other occupants of the vehicle 13 can view the augmented image frame 55.

The functions of the various layers and sub-engines of the augmentation engine 71 are further described as follows. The environmental data 75 and the stylized image 81 are initially fed into the input layer 83, one or more hidden layers 85, and an output layer 87 of the augmentation engine 71. Collectively, the input layer 83, one or more hidden layers 85, and the output layer 87 use algorithms such as a Histogram of Oriented Gradients (HOG), You Only Look Once (YOLO), Residual Network (ResNet) or equivalent algorithms to isolate physical objects in an input image. Thus, the layers 83-87 may collectively be referred to as machine learning image processing layers herein, as the layers 83-87 use a machine learning algorithm to extract the location of various physical objects in an input image. Feature extraction is performed on both the stylized image 81 and the environmental data 75 captured by the first sensor 15 (i.e., image frames of the external environment of the vehicle 13).

The input layer 83 serves as an initial layer for the reception of the environmental data 75 and the reception of the stylized image 81. The one or more hidden layers 85 includes layers such as a convolution layer that produces a feature map of an input (i.e., the stylized image 81 and the environmental data 75). Initially, the input image is converted by the input layer 83 to a matrix of values, where each value corresponds to the color of a pixel located at the same location in the input image. The matrix representation of the input image is subsequently convolved with a filter in a convolution layer of the one or more hidden layers 85, where the filter structure varies according to the feature that the neural network is developed to extract. For example, a filter used to detect the location of a tree within an input image will have different values than a filter used to detect the location of a traffic vehicle within the input image.

The output of the convolution operation is a feature map that details locations of the convolved matrix representation. The feature map is a representation of the likelihood that a particular feature is present in a specific portion of the input image. For example, a feature map produced by a convolutional layer of the one or more hidden layers 85 may depict that a tree is likely to be present in the upper-right hand corner of an input image provided by the first sensor 15, or more generally the environment sensors 73.

The one or more hidden layers 85 may further include a pooling layer, which reduces the dimensions of outputs of the convolution layer into a down sampled feature map. For example, if the output of the convolution layer is a feature map with dimensions of 4 rows by 4 columns, the pooling layer may down sample the feature map to have dimensions of 2 rows by 2 columns, where each cell of the down sampled feature map corresponds to 4 cells of the non-down sampled feature map produced by the convolution layer. The down sampled feature map allows the feature extraction algorithms to pinpoint the general location of various objects detected with the convolution layer and filter. Continuing with the example provided above, an upper left cell of a 2×2 down-sampled feature map will correspond to a collection of 4 cells occupying the upper left corner of the feature map. This reduces the dimensionality of the inputs to the augmentation engine 71, such that an image comprising multiple pixels can be reduced to a single output of the location of a specific feature within the image. In the context of the various embodiments described herein, a feature map may reflect the location of various physical objects in the stylized image 81 and/or the environmental data 75. Similarly, a down-sampled feature map identifies the general location of various physical objects in the stylized image 81 and/or the environmental data 75.

The number of convolution and pooling layers depend upon the specific network architecture and the algorithms employed by the augmentation engine 71, as well as the number and type of objects that the augmentation engine 71 is configured to detect. For example, a neural network flexibly configured to detect multiple types of objects will generally have more layers than a neural network configured to detect a single object. Thus, the specific structure of the augmentation engine 71, including the number of hidden layers 85, is determined by a developer of the augmentation engine 71 and/or the system 11.

The feature maps produced in the one or more hidden layers 85 are subsequently passed to an output layer 87. The output layer 87 includes a loss function that serves to minimize or maximize an error of the augmentation engine 71 in order to weigh the relative importance of outputs of the pooling and convolution layers.

For example, an output layer 87 may receive multiple feature maps representing the likelihood that a tree, a traffic vehicle 41, or other objects are depicted in the external environment 49. The output layer 87 proceeds to determine the probability that a specific feature is present at a location identified by a feature map and performs this determination for each feature map received such that the output of the output layer 87 is a list of pixel locations and the identities of extracted features 97 within the environmental data 75. Examples of loss functions utilized by the output layer 87 as described herein include a maximum likelihood function, a Mean Square Error (MSE), a Mean Absolute Error (MAE), or a binary cross entropy function. Alternatively, the output layer 87 may utilize a SoftMax function, rather than a loss function, to determine the probability that a particular object is located within the input image.

In addition to determining the pixel location of the particular object, the hidden layers 85 include functionality to determine an orientation and three dimensional (3D) shape of the particular object. The orientation and shape of the object is determined using shape-from-X techniques, which involves determining the positioning of the object based upon its contour, texture, or shading as captured by the first sensor 15. More specifically, based upon the gradual darkening of an object (due to its shading from a light source such as the sun), the hidden layers 85 are configured to determine the pose of the particular object, as well as the curvature thereof. To this end, the one or more hidden layers 85 compares the color values of pixels of a physical object in various locations captured by the first sensor 15 to the primary colors of the physical object, and groups the colored pixels forming the physical object into simple geometric shapes according to their constituent colors. Thus, the shape of the particular physical object may be represented as a 3D mesh of prisms or other simple geometric shapes. The mesh may be denoted in the bitmap of the physical object, or be stored as separate data by the augmentation engine 71.

Accordingly, the output of the output layer 87 is the location, 3D shape, and identity of a particular object within the input image (i.e., the environmental data 75 and/or the stylized image 81). However, such merely relates to a pre-existing object that can be identified within the received environmental data 75 and/or stylized image 81. As the augmented image frame 55 includes digital scenery, which may not be able to be extracted from a stylized image 81 or the environmental data 75, the augmentation engine 71 further includes sub-engines that generates the digital counterparts of physical objects extracted from the environmental data 75. Such sub-engines include the AR recommender sub-engine 89, the augmentation content sub-engine 91, and the rendering sub-engine 93, each of which are further discussed below.

Initially, the AR recommender sub-engine 89 receives an augmentation class from the preference cache 77. In addition, the AR recommender sub-engine 89 receives the environmental data 75 from the environment sensors 73, as well as the identity of any objects extracted from the input image. As discussed above, the preference cache 77 includes information regarding the user's desired configuration of the augmented image frame 55 by way of user preference data 79. For example, user preference data 79 received from the preference cache 77 includes an indication of whether the user wishes to see sponsored content (e.g., FIG. 6) in the augmented image frame 55, as well as the desired augmentation class. Further examples of user preference data 79 include whether the user desires to have auxiliary scenery 69 introduced into the augmented image frame, and other preferences further reflected and discussed in conjunction with FIG. 8, below.

The AR recommender sub-engine 89 itself serves as a collection point for each type of data used by the sub-engines of the augmentation engine 71. Once the data is received from the environment sensors 73 and the ECU 21 (which captures the user preference data 79 using a Graphical User Interface (GUI)), the AR recommender sub-engine 89 further determines the specific content to be introduced into the augmented image frame. More specifically, the AR recommender sub-engine 89 determines, based upon the user's selection, which of the user preferences in the user preference data 79 are to be reflected in the augmented image frame. For example, if the user has selected (via the ECU 21) that sponsored content is to be introduced into the augmented image frame 55, then the AR recommender sub-engine 89 determines that sponsored content is to be included in the augmented image frame, and further determines the type of sponsored content to be introduced.

Generally, sponsored content refers to information such as advertisements that may be presented to the user, based upon an author of the sponsored content reaching an agreement with a manufacturer of the system 11, and is further discussed in relation to FIG. 6, below. For example, sponsored content may correspond to discounts offered by businesses in the external environment 49 of the vehicle 13, or alternatively correspond to a sample product produced by the business. Continuing with the example, a sample product produced by a digital media business may correspond to a snippet of a representative commercial produced by the digital media business. Accordingly, the output of the AR recommender sub-engine 89 is recommended content data 95 that should be introduced into the augmented image frame 55 by the rendering sub-engine 93, and does not include objects extracted from an input image. The recommended content data 95 is formed as a list of recommended content and their associated storage locations (i.e., the memory 37 of the server 29 or a memory 37 of the vehicle 13 as depicted in FIG. 4), which is subsequently passed to the augmentation content sub-engine 91.

Based upon the augmentation class received from the preference cache 77 and the identity of the objects received from the layers 83-87, the augmentation content sub-engine 91 determines digital counterparts of the identified objects to be superimposed into the augmented image frame 55. The augmentation class is associated with digital counterparts by way of a database or lookup table stored in the memory 37 of the server 29 or the memory 37 of the ECU 21 (e.g., FIG. 4). As such, the augmentation content sub-engine 91 accesses the database with a lookup function to find an extracted object associated with a specific augmentation class. A representative example of such a lookup table is depicted in Table 1, below.

TABLE 1

| | | | | | |
|---|---|---|---|---|---|
| Augmentation Class Database | | | | | |
| Class | Phys. Obj. | Dig. Counterpart | Aux. Scenery | Phys. Obj. | Dig. Counterpart |
| Underwater | "Tree" | Seagrass.jpg SeaCucumber.jpg | Bubbles.jpg Fish.jpg | "Traffic Vehicle" | Boat1.jpg |
| Watercolor | "Tree" | Watercolor_tree1.jpg Watercolor_tree2.jpg | Leaves.jpg Log.jpg | "Traffic Vehicle" | Rustic_truck.jpg; Classic_automobile.jpg |

TABLE 1-continued

| | | Augmentation Class Database | | | |
|---|---|---|---|---|---|
| Class | Phys. Obj. | Dig. Counterpart | Aux. Scenery | Phys. Obj. | Dig. Counterpart |
| Dreamscape | "Tree" | Dreamscape_tree1.jpg Dreamscape_tree2.jpg | Cloud.jpg | "Traffic Vehicle" | Cloud_car1.jpg Cloud_car2.jpg |

As shown in Table 1, each augmentation class is represented in the first column, and representative augmentation classes include an "underwater" class, a "watercolor" class, and a "dreamscape" class. Each augmentation class is associated with multiple extracted physical objects that may be found in the external environment 49 of the vehicle 13, such that each augmentation class is preconfigured with specific objects that may potentially be identified by the environment sensors 73. These objects are reflected in columns 2 and 5, respectively, as a "tree" and a "traffic vehicle." Each potential extracted object is associated with digital counterparts in the column directly to the right of the "extracted object" column. Thus, digital counterparts of a "tree" are associated with each augmentation class in the third column of Table 1, while digital counterparts of a "traffic vehicle" are associated with each augmentation class in the fifth column of Table 1.

The digital counterparts are stored in the augmentation class database (e.g., Table 1) as a file path corresponding to an image depicting the digital counterpart. Each physical object is associated with one or more digital counterparts, such that the augmentation content sub-engine 91 may have multiple digital counterparts to choose from for a specific extracted physical object. This further increases the immersivity of the augmented image frame 55 presented to the user or associated party, as the digital scenery 59 introduced into the augmented image frame 55 will vary similar to real-life driving conditions. The selection of which digital counterpart to introduce into the augmented image frame 55 depends upon the number of physical objects extracted from an input image. For example, the augmentation content sub-engine 91 may be configured to introduce a second digital counterpart for every third extracted object having the same identity. Continuing with the example, this causes the overall digital scenery 59 to have ⅔rds of the digital counterparts correspond to a first digital object, and ⅓rd of the digital counterparts will be associated with a second digital object, where the first and second digital object both correspond to the same extracted physical object represented in the second or fifth column of Table 1.

The third column of Table 1 corresponds to auxiliary scenery 69 associated with the extracted object and the augmentation class. For example, row 1 of Table 1 corresponds to an "underwater" augmentation class, and has a "tree" as an extracted physical object. Thus, the digital counterpart of the "tree" for an "underwater" augmentation class may be either of a "Seagrass.jpg" file or a "SeaCucumber.jpg" file, where ".jpg" represents that the digital counterpart is an image with a Joint Photographic Experts Group (JPG) format located at a particular file path of the memory 37. Similarly, the auxiliary scenery 69 for a "tree" and an "underwater" augmentation class is either of a "Bubbles.jpg" file or a "Fish.jpg" file. As discussed above, the amount of auxiliary scenery 69 to introduce into the augmented image frame 55 depends upon the number of physical objects extracted from an input image. For example, an input image with a high number of physical objects (and, thus, a large number of digital counterparts) will be augmented with little to no auxiliary scenery 69, so as not to further distract the user. On the other hand, an input image that has few physical objects will be augmented with a relatively large amount of auxiliary scenery 69 instances in order to provide a more immersive driving experience to the user. Accordingly, the amount of auxiliary scenery 69 depends on a function predetermined by a manufacturer of the system 11.

Subsequently, the augmentation content sub-engine 91 passes the location, the shape (as a mesh of pixel groupings with similar colors based on the contour of the object as discussed above), and the number of digital counterparts of the extracted objects, as well as the amount and type of auxiliary scenery 69 to the rendering sub-engine 93 as augmentation content data 92. The augmentation content data 92 further includes the sponsored content and any user preference data 79 sent to the rendering sub-engine 93, such that the augmentation content data 92 also includes the recommended content data 95. As noted above, the recommended content data 95 is a list of the identity and location of any digitized objects, sponsored content, and other information or icons to be introduced into the augmented image frame 55 by the rendering sub-engine 93. In conjunction with the augmentation content data 92, the rendering sub-engine 93 further receives the input image contained in the environmental data 75 captured by the environment sensors 73. After receiving the augmentation content data 92 and the environmental data 75, the rendering sub-engine 93 forms the augmented image frame 55 based thereon.

The process used to create the augmented image frame 55 by the rendering sub-engine 93 is further described in relation to FIGS. 5A-5D. In relation to FIG. 3 and as noted above, the rendering sub-engine 93 receives a list of physical objects located in the environmental data 75, as well as their pixel locations, from the layers 83-87 as extracted features 97. The extracted features 97 is presented to the rendering sub-engine 93 in raster (or bitmap) format, and includes bitmap data of bounding boxes representing the location of physical objects, as well as class predictions derived by the one or more hidden layers 85 as described above.

Subsequently, the rendering sub-engine 93 replaces the physical objects located in the bounding boxes with their digitized counterparts. As discussed above, the digitized counterparts are stored in the form of a lookup table such that the digitized counterparts are associated with both the physical object and an augmentation class. Furthermore, the digitized counterparts are stored in the lookup table (e.g., Table 1) as a location of an image in raster format, such as JPEG. Thus, the process of replacing the physical objects involves replacing the bitmap values of the physical objects with those of the digitized objects. In the event that the digitized counterpart has a different size than the bounding box of the physical object, the digitized counterpart may be scaled by the rendering sub-engine 93 to be the same size as the physical object. Furthermore, if the rendering sub-engine 93 is provided with a 3D mesh of the physical object by the one or more hidden layers 85, then the rendering sub-engine 93 replaces the pixel colors within each prism of the mesh with pixel colors from the digital object that correspond to the pixel colors of the portion of the physical object contained within a particular shape of the mesh.

By way of example, a physical object that is an ash tree with a rounded, ash-grey trunk may be replaced with a digitized object that is a maple tree with a trunk having an auburn hue. In this case, the surface of the digitized object is converted into a mesh, where each shape within the mesh has a different shade of ash-grey based upon the orientation and shading of the physical object (i.e., the ash tree). The mesh is output to the output layer 87, and the shading of the auburn hues that form the trunk of the digitized maple tree is modified, based upon the location of the shapes of the mesh and the colors thereof, such that the digitized object appears to have the same orientation, contour(s), and shading as the physical object. Furthermore, the digitized object may be wrapped to match the shape of the mesh of the physical object, such that the digitized object is depicted as a 3D object to the user. Such a process may involve, for example, sectioning the digitized object with a mesh that matches the mesh forming the physical object, and positioning the sections of the digitized object within the augmented image frame 55 to give the digitized object the same shape as the physical object.

Thus, the output of the rendering sub-engine 93 is an augmented image frame 55 in raster format that includes the digital counterparts in the same location, size, and orientation as their associated physical objects, without the inclusion of the physical objects themselves. The augmented image frame 55 is subsequently output to devices of the system 11, including the mobile device 39 and/or the infotainment module 19, for viewing by the user or an associated person.

Turning to FIG. 4, FIG. 4 presents a detailed overview of the physical hardware used in the system 11. As shown in FIG. 4, a server 29 is wirelessly connected to a mobile device 39, a wearable device 25, and a vehicle 13 via transceivers 31. More specifically, each of the transceivers 31 belonging to the vehicle 13, the server 29, the mobile device 39, and the server 29 includes components such as photodiodes and photoreceptors, or oscillatory transmission and reception coils that transmit data signals therebetween. The data signals may, for example, be transmitted according to wireless signal transmission protocols, such that the transceivers 31 transmit Wi-Fi, Bluetooth, Wi-Max, or other signals of various forms as described herein. In this way, the transceivers 31 form a wireless data connection 27 that allows for the various data described herein to be transmitted between devices of the system 11.

In addition to a transceiver 31, each of the vehicle 13, the wearable device 25, the server 29, and the mobile device 39 include a processor 33. As noted above, the processor 33 may be formed as a series of microprocessors, an integrated circuit, or associated computing devices that serve to execute instructions presented thereto. Similarly, each of the vehicle 13, the wearable device 25, the server 29, and the mobile device 39 include a memory 37. The memory 37 is formed as a non-transient storage medium such as flash memory, Random Access Memory (RAM), a Hard Disk Drive (HDD), a solid state drive (SSD), a combination thereof, or equivalent devices. Each of the memories 37 hosts an operating system of its respective device, and well as computer instructions for performing any operations with the associated device. As one example, computer readable code forming the augmentation engine 71 may be hosted either entirely on the memory 37 of the vehicle 13, or split between a combination of the memory 37 of the server 29 and the memory 37 of the vehicle 13. In either case, the computer readable code forming the augmentation engine 71 is executed as a series of instructions by the processor 33 of the server 28 or the vehicle 13 as discussed above. As a second example, the memory 37 of the wearable device 25 stores computer code representing instructions for collecting vital signs of the user, such as when and at what intensity to operate a vitals sensor 99 thereof. Similarly, the memory 37 of the server 29 includes computer code for the memory 37 to transmit and receive user data via a wireless connection, as well as computer code to capture a user input to the mobile device 39.

In addition to the transceiver 31, the processor 33, and the memory 37, the server 29 includes a graphics card 35. The graphics card 35 performs graphic processing, and is configured in such a way that the graphics card 35 can perform multiple, concurrent calculations. Such is beneficial during computationally intensive image analysis, as the repetitive computations performed by the layers 83-87 (i.e., high contrast edge detection of multiple groups of pixels) may be performed in parallel rather than in sequence. Although not depicted in FIG. 4, the vehicle 13 may be configured with a graphics card 35 in cases where the augmentation engine 71 is hosted entirely on the vehicle 13. To allow for processing between the various components of the server 29, the server 29 further includes a data bus 23. The data bus 23 is formed as one or more wires, wire terminals, or other electrically connective pathways that allow electric signals to be transmitted between the various components of the server 29. That is, the data bus 23 provides physical connections between each of the transceiver 31, the processor 33, the graphics card 35, and the memory 37 for data transmission and reception purposes.

Turning to the vehicle 13, the vehicle 13 includes an Electronic Control Unit (ECU) 21 that further includes the transceiver 31, the processor 33, and the memory 37. The ECU 21 further comprises an application layer 111 and an Application Programming Interface (API) layer 113. Each of the application layer 111 and the API layer 113 are formed by computer readable code stored on the memory 37, and perform various functions of the ECU 21. More specifically, the application layer 111 serves to execute functions of the augmentation engine 71 performed locally on the vehicle 13, such as serving as a collection point for the environmental data 75. Alternatively, if the augmentation engine 71 is entirely hosted on the vehicle 13, then the application layer 111 comprises the augmentation engine 71 itself and all functions associated therewith.

On the other hand, the API layer 113 provides an editable portion of the computer code forming the augmentation engine 71, which allows a programmer to further adapt the system 11 to the specific use case of the user. For example, the API layer 113 allows a programmer (or other manufacturer of the system 11) to change the user preferences presented to a user via the infotainment module 19. To this end, the infotainment module 19 is depicted in FIG. 4 as being connected to the ECU 21 in the vehicle 13 by way of a data bus 23. For its part, the infotainment module 19 is formed, for example, as a touchscreen display or a display controlled by dial, switches, knobs, or equivalent components that allow a user to interact with and change settings of the vehicle 13.

The ECU 21 is also connected to various environment sensors 73 located on board the vehicle 13, which include an Inertial Movement Unit (IMU) 101, a first sensor 15 (i.e., a mono or stereo camera), a second sensor 17 (i.e., a LIDAR or Radar unit), a navigation sensor 103, a weather sensor 105, and the projection unit 53 and windshield 57. Each of these environment sensors 73 serve to capture various forms of environmental data 75 related to the vehicle 13 traversing the external environment 49. For example, the IMU 101 captures the orientation and angular movements of the vehicle 13, and may be embodied as an accelerometer or a gyroscope. Similarly, the weather sensor 105 detects various weather conditions of the vehicle 13, and may be formed as a wind detection device such as an anemometer, and/or a rain sensor such as a Rain Light Sensor (RLS) or Rain Light Solar Sensor (RLSS), or equivalent devices. On the other hand, the navigation sensor 103 is formed as a Global Positioning System (GPS) unit that interfaces with a positioning satellite to determine the position of the vehicle 13 via triangulation or trilateration, for example.

The data captured by the environment sensors 73 described above is further used by the augmentation engine 71 to create the augmented image frame 55. For example, the augmentation engine 71 may compare a speed limit of a road 43 captured in an extracted physical sign 47 to a speed of the vehicle 13 captured by the IMU 101 or using data of the navigation sensor 103. In the event that the user is driving above the captured speed limit and the user has selected a "mood visualizer" as a user preference option, the AR recommender sub-engine 89 will output a visualizer associated with an excited mood, as the user is driving quickly relative to its external environment 49. The creation of the mood visualizer is further discussed in relation to FIG. 6, below. Furthermore, if the weather sensor 105 captures data describing that the external environment 49 includes snow or rain, the augmentation engine 71 may further reflect these conditions in the augmented image frame 55 by introducing additional corresponding auxiliary scenery 69 therein.

The wearable device 25 and the mobile device 39 are formed by similar components insofar as these devices generally serve similar purposes of capturing information related to the user of the vehicle 13. Thus, each of the wearable device 25 and the mobile device 39 include components such as a processor 33, a memory 37, a vitals sensor 99, an IMU 101, and an interface 115. The processor 33 serves to execute computer readable code stored on a memory 37 in order for the mobile device 39 and the wearable device 25 to perform their associated functions and applications of capturing data from its associated sensors. The interface 115 includes a touchscreen display such as an LCD or OLED display with a touchscreen layer disposed thereon. Alternatively, the interface 115 may be formed by an actuation device such as dial or button, or both a touchscreen and an actuation device. In this way, the interface 115 provides a way for the wearable device 25 and the mobile device 39 to capture the users input and preferences. Similarly, the infotainment module 19 may be formed with a touchscreen and display in order to capture a user's preferences with the vehicle 13 itself, as described above.

The IMU 101 serves to capture an orientation and movements of the wearable device 25 and the mobile device 39, and is formed by an accelerometer or gyroscope as described above. However, the IMU 101 of the mobile device 39 may capture different data than the IMU 101 of the wearable device 25 if the mobile device 39 is possessed by a different user of the vehicle 13 than a user in possession of the wearable device 25. For example, a wearable device 25 may be worn by an adult driver of a vehicle, while the mobile device 39 is passed to a child or other passenger of the vehicle 13 such that the other user is viewing the augmented image frame 55 by way of the mobile device 39. Such a scenario is beneficial for the overall safety of the users in the vehicle 13, as multiple parties are viewing the road 43 and potential dangers thereof.

Similarly, the mobile device 39 and/or the wearable device 25 include a vitals sensor 99 that captures data related to vital signs of the user. Such vital signs as described herein include a heart rate of an associated user, an oxygen saturation, and equivalent metrics of a user's bodily functions, and are captured by emitting, receiving, and analyzing an infrared light beam with the corresponding device. Collectively, the vitals sensor 99 and the IMU 101 transmit their data to the augmentation engine 71 (which may be housed on the vehicle 13 or the server 29), and the augmentation engine 71 determines an agitation or excitement level of the user based on the transmitted data. As described in relation to FIG. 6, the augmentation engine 71 uses the user excitement level to create a mood visualizer as one instance of an augmented image frame 55. Thus, overall, the environment sensors 73 of the vehicle 13, the wearable device 25, and the mobile device 39 serve to provide information to the augmentation engine 71 that is later reflected in the augmented image frame 55.

Figures 5A, 5B, 5C, 5D:
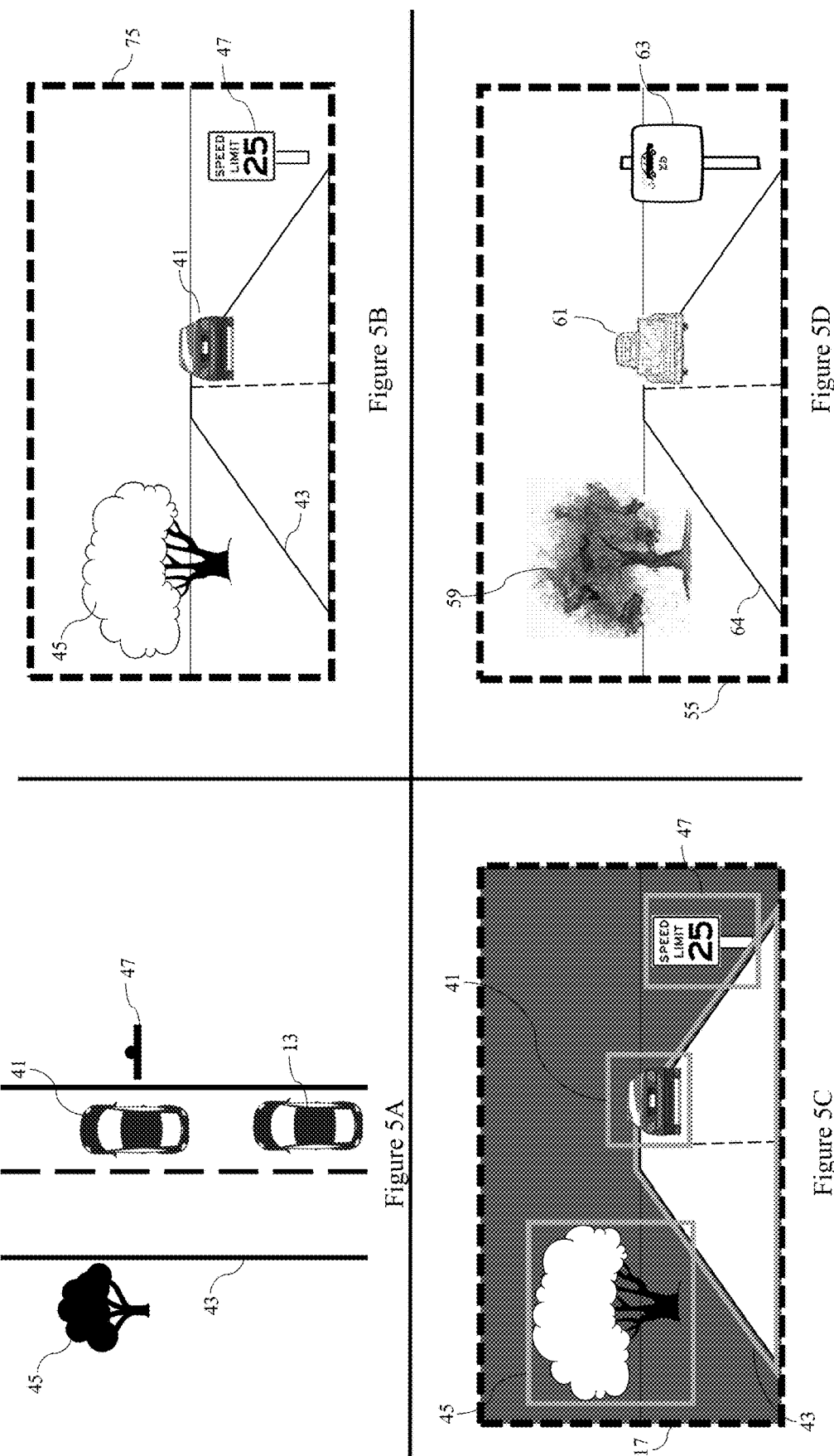
FIGS. 5A-5D depict a visualization of a process for creating an augmented image frame in accordance with one or more embodiments disclosed herein.

Turning to FIG. 5A, FIG. 5A depicts a detailed visualization of a process for creating an augmented image frame 55 with an augmentation engine 71. As shown in FIG. 5A, the vehicle 13 is driving along a road 43 that is bordered by physical scenery 45 (e.g., trees) and a sign 47, which form the external environment 49 of the vehicle 13. As shown in FIG. 5A, the vehicle 13 is trailing a traffic vehicle 41. While the vehicle 13 is driving along the road 43, environment sensors 73 of the vehicle 13 capture each of these objects as environmental data 75, which includes data such as an image of the external environment 49 captured by a first sensor 15 of the vehicle 13.

Such an image of the external environment 49 (i.e., an environment image frame) is reflected in FIG. 5B as environmental data 75, and is further transmitted to the input layer 83 of the augmentation engine 71. The environmental data 75 reflects the location of the objects of the external environment 49 as viewed from a cabin 51 of the vehicle, similar to the view depicted in FIG. 2B. Thus, the environmental data 75 further includes the physical scenery 45, the traffic vehicle 41, the road 43, and the sign 47, which constitute the physical objects of FIG. 5A.

Turning to FIG. 5C, FIG. 5C depicts a visualization of an annotated image 117 produced by the augmentation engine 71. As discussed above, the augmentation engine 71 uses an object detection algorithm, such as YOLO or Faster Region Based Convolutional Neural Network (Faster RCNN) that performs convolution, pooling, and classification operations in its one or more hidden layers 85 to identify the physical objects of the environmental data 75 reflected in FIG. 5B. Thus, as depicted in FIG. 5C, one output of the one or more hidden layers 85 is an annotated image 117, which includes bounding boxes around detected objects. Accordingly, the annotated image 117 depicts a bounded scenery 45, a bounded traffic vehicle 41, a bounded road 43, and a bounded sign 47, where each of these objects are bordered by a bounding box.

The augmentation engine 71 receives the locations and identities of each object in the annotated image 117 of FIG. 5C. Based on the identity of the captured object, the augmentation content sub-engine 91 determines a digital counterpart of the captured object. As discussed above, this is performed by searching a lookup table (i.e., Table 1) to find an augmentation class selected by the user, and determining the digital counterpart that corresponds to the selected augmentation class and detected physical object. For example, and as shown in FIG. 5D, the user has selected a "countryside" augmentation class, such that a digital scenery 59, a digital traffic vehicle 61, a digital sign 63, and a digital road 64 are thematic representations of their associated physical objects as they might appear in a rural farming community.

The location of the extracted physical object is identified to the augmentation engine 71 as the bitmap location of the physical object, and the augmentation engine 71 replaces the pixel colors corresponding to the physical object with the pixel colors corresponding to the digital counterpart. If the digital counterpart and the extracted physical object have different sizes, the augmentation content sub-engine 91 may rescale the digital counterpart and perform associated post-processing such that the digital counterpart has the same size as the physical object. The output of this process is depicted in FIG. 5D, which depicts an augmented image frame 55 including the digital scenery 59, the digital traffic vehicle 61, the digital sign 63, and the digital road 64 as discussed above. Thus, the output of the augmentation engine 71 as a whole is an augmented image frame 55 that reflects a user's preferred augmentation class and presents an altered reality view thereto.

Figure 6:
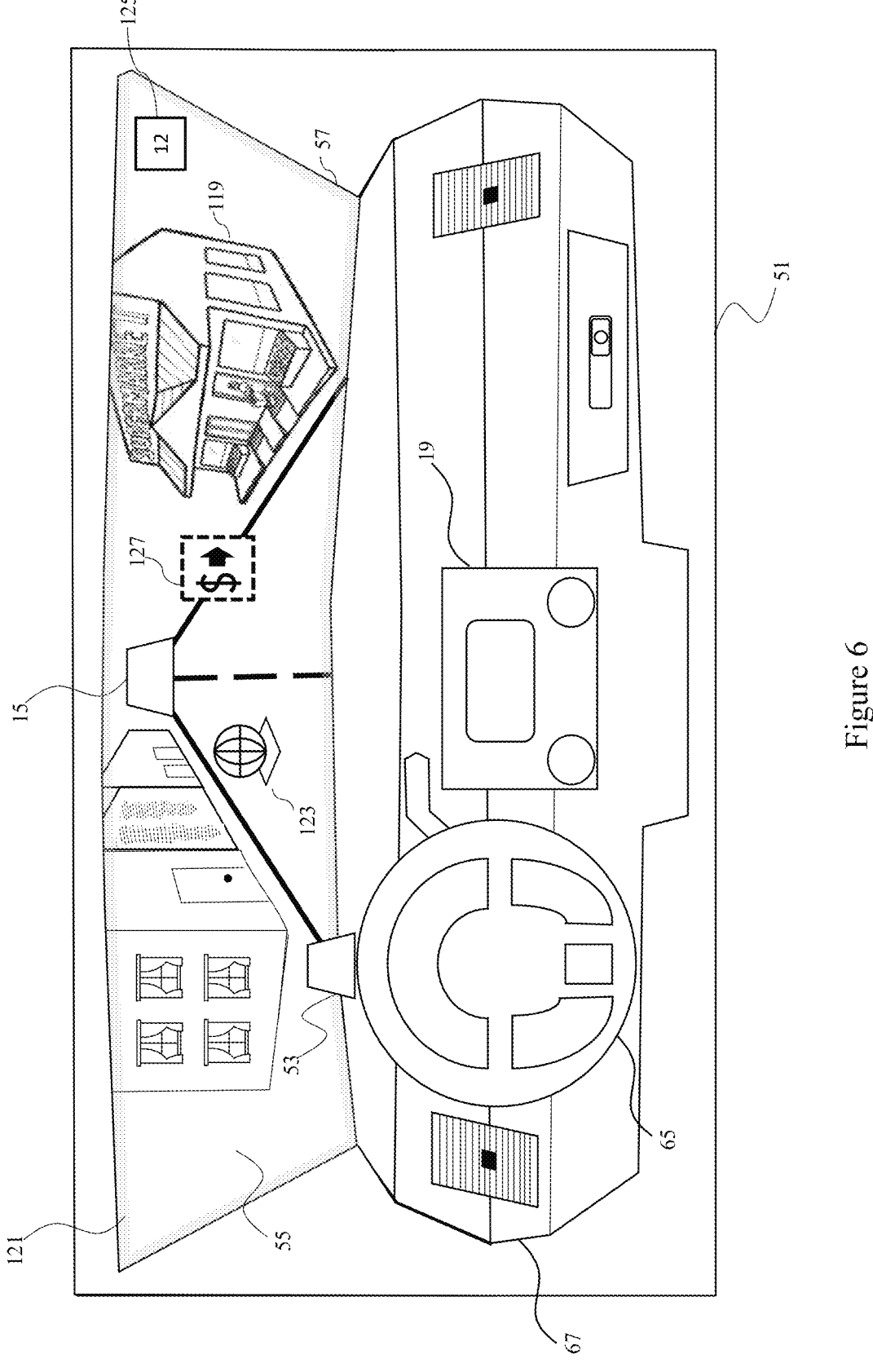
FIG. 6 depicts a cabin of a motor vehicle in accordance with one or more embodiments disclosed herein.

Turning to FIG. 6, FIG. 6 depicts further examples of how an augmentation engine 71 may introduce additional content into an augmented image frame 55. Specifically, FIG. 6 depicts a cabin 51 of a vehicle 13, where the vehicle 13 includes a steering wheel 65, a dashboard 67, a projection unit 53, a windshield 57, and an infotainment module 19, the functions of which are discussed above in relation to FIG. 2B. In particular, the projection unit 53 comprises a light source coupled to a processor (not shown) that receives the augmented image frame 55 from the augmentation engine 71 via the ECU 21. The projection unit 53 proceeds to display the augmented image frame 55 onto the windshield 57, where the windshield 57 comprises an at least partially transparent polarized substrate layer that reflects the augmented image frame 55 to a user's eyes.

As shown in FIG. 6, the augmented image frame 55 differs from the various embodiments thereof described previously in the sense that an augmentation class has not been applied to the augmented image frame 55 such that the various attractions 119 that are physically located in the vicinity of the vehicle 13 are not visually modified by the augmentation engine 71 in the augmented image frame 55. Instead, the augmented image frame 55 is augmented by way of a filter 121 applied to the periphery of the augmented image frame 55, where the filter 121 includes a modification to a saturation, hue, or light intensity parameter of at least a portion of the augmented image frame 55. The filter 121 functions as a mood visualizer for a driver or other user of the vehicle 13, where the various modified parameters are determined based on the activity level of the user. For example, if vital signs of a user captured by the vitals sensor 99 indicate that the user has a vital signs (e.g., a heart rate) above a predetermined threshold (e.g., 120 beats per minute), the augmentation engine 71 may conclude that the user is in an agitated state. In this case, the augmentation engine 71 changes the appearance of the filter 121 to a red color, to indicate to the user that they are stressed or otherwise upset. Alternatively, the filter 121 may display a calming color, such as blue, green, or purple, to attempt to reduce the user's agitation. On the other hand, if the user's vital signs captured by the vitals sensor 99 indicate that the user has vital signs below a predetermined threshold, the augmentation engine 71 may conclude that the user is in a tired state, and display increased levels of blue light in the filter 121 to attempt to wake the user up. In this way, the filter 121 functions to display a color associated with the mood of the user, which is beneficial in the above described situations where a user is in an undesirable mood (e.g., frustrated or tired) that they may not be aware of due to various distractions in their environment, or due to the mood itself.

In addition to the filter 121, FIG. 6 further depicts a collectible 123 as being displayed in the augmented image frame 55. The collectible 123 is recommended content implemented by the augmentation engine 71 in the augmented image frame 55. The collectible 123 further corresponds to a representative icon of a gameplay application of the augmentation engine 71, and may further also be exchangeable with real world currencies such as cryptocurrencies or Non-Fungible Tokens (NFTs). As the augmented image frame 55 is also displayed on a mobile device 39, the collectible 123 may be collected by way of the interface 115 of the wearable device 25 or mobile device 39, or by tapping a digital button (not shown) displayed on the infotainment module 19, for example. The number of collectible(s) 123 interacted with or successfully collected by a user are displayed by way of a counter 125, or information box, displayed in a non-intrusive portion of the augmented image frame 55 (i.e., the upper corners thereof). As discussed in relation to FIG. 7, below, the collectible 123 may instead correspond to a metaverse application currency, such as a monetary token used by a merchant in a digital metaverse business application. Thus, the number of collectibles 123 displayed in the augmented image frame 55, as well as locations thereof, are determined according to a manufacturer's specification, as the collectible 123 may be traded for a real-world currency. In addition, the selection of whether to include the collectible 123 in the augmented image frame 55 is selected as a user preference by way of the infotainment module 19 and implemented into the augmented image frame 55 by way of the augmentation engine 71 and the preference cache 77 storing user preference data 79.

Continuing with FIG. 6, another example of recommended content is sponsored content 127, which is information presented to a user of the vehicle 13 in the form of a textbox containing a text description or graphical depiction of related to the local attractions 119. In this way, the sponsored content 127 contains information concerning the various attractions 119 in the area, and serves as an advertising platform therefore. Thus, sponsored content 127 may display information related to a sale being run by a local business or an exhibit being displayed by a museum, for example. The sponsored content 127 may further include samples of the businesses' work, such as an image of a product manufactured or sold by the business, and/or directions to the business/attraction 119. Accordingly, the sponsored content 127 further allows a user to be apprised of appealing nearby events.

Figure 7:
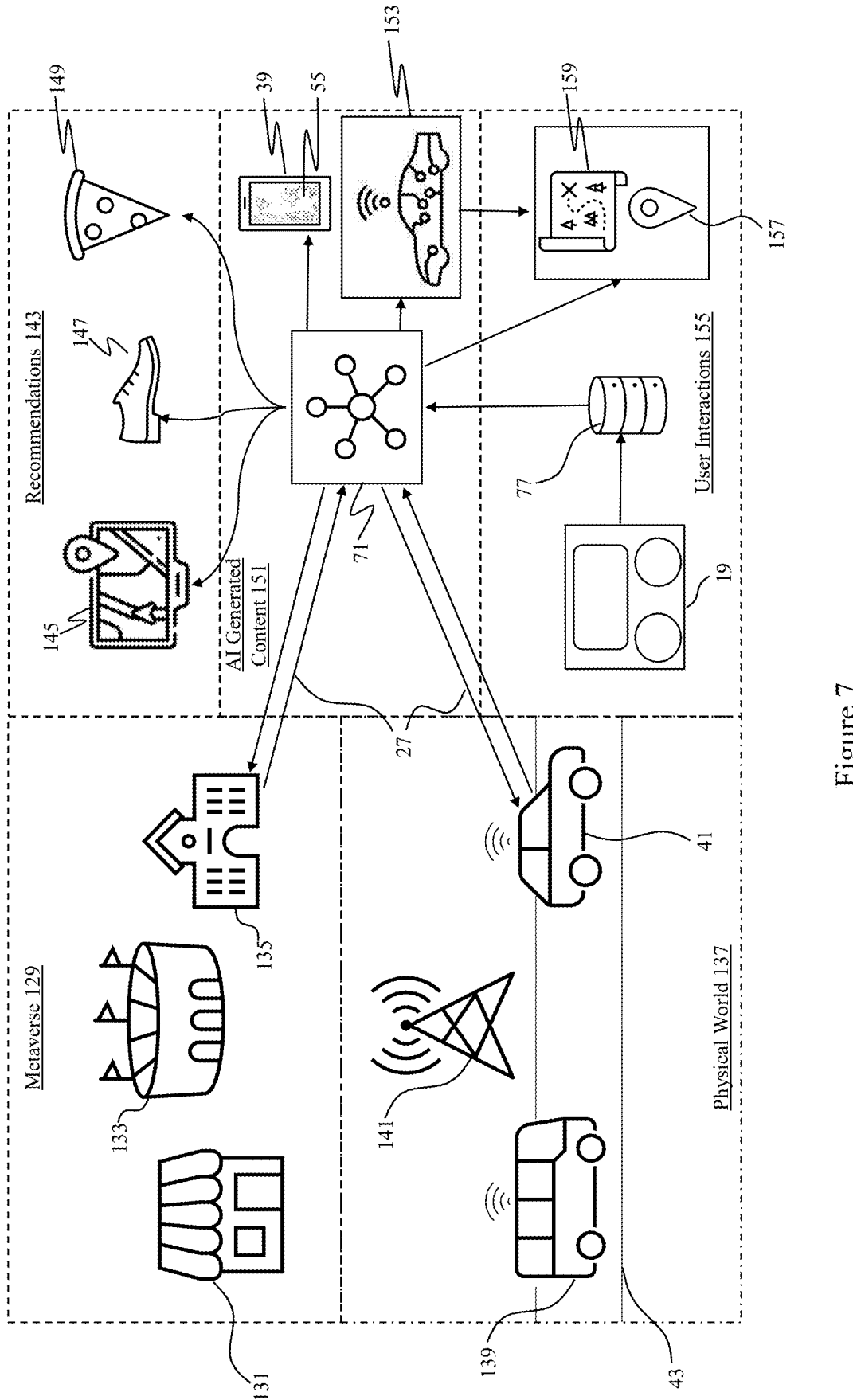
FIG. 7 depicts a system in accordance with one or more embodiments disclosed herein.

Turning to FIG. 7, FIG. 7 depicts various examples of recommended content that may be captured in the recommended content data 95 presented to the augmentation engine 71, as well as real-world examples of data transmitted thereto. More specifically, FIG. 7 depicts that an augmentation engine 71 receives data concerning a metaverse 129 via a data connection 27 from a server 29, where the metaverse 129 is described herein as a digital universe that is controlled by physical entities and corporations. For example, the metaverse 129 is depicted in FIG. 7 as including a shop 131, a stadium 133, and an institute 135. The shop 131 is a digitized representation of a local shop in the vicinity of the vehicle 13, while the stadium 133 and the institute 135 correspond to facilities owned and operated by a local university, for example. Thus, recommended content received by the metaverse 129 includes digital currencies (as a collectible 123) used by the shop 131, stadium 133, or institute 135, or advertisements related to these locations presented as sponsored content 127. Alternatively, if a user selects a "metaverse" augmentation class, then the physical depictions of the local shop and the university may be replaced in the augmented image frame 55 with their metaverse 129 counterparts (i.e., the shop 131, the stadium 133, and the institute 135).

In addition, the augmentation engine 71 receives physical world 137 data from various vehicles disposed therein. For example, the physical world 137 is depicted as including a school bus 139 and a traffic vehicle 41 traveling on a road 43, where the school bus 139 and the traffic vehicle 41 are wirelessly connected to a Road Side Unit (RSU) 141 by way of a cellular, Wi-Fi, or equivalent data connection. Thus, the school bus 139 and the traffic vehicle 41 are capable of communicating data representing their motion to the augmentation engine 71, which may act in accordance with the received data. For example, if the school bus 139 or the traffic vehicle 41 stops suddenly, a filter 121 may be applied to the augmented image frame 55 by the augmentation engine 71 as a glowing red band surrounding the digital counterpart of the school bus 139 or traffic vehicle 41. Alternatively, if the school bus 139 or the traffic vehicle 41 are stopped (e.g., to drop off passengers or for a mechanical failure), then the augmentation engine 71 may display a textbox above the stopped vehicle as recommended content, where the textbox provides a warning that the user's vehicle 13 should go around the stopped vehicle. In this way, the recommended content derived from the physical world 137 relates, in one example, to data received from other drivers sharing the road 43 with the user.

Further examples of recommended content are presented as recommendations 143 of FIG. 7. As shown in the recommendations 143, the augmentation engine 71 may introduce functional recommendations 145, and sponsored content 127 related to apparel 147 and dining 149. Functional recommendations 145 include locations for performing routine vehicle maintenance such as oil changing facilities, gas stations, and repair parts stores. The functional recommendations 145 may be selectively introduced into the augmented image frame 55 by the augmentation engine 71 based upon the need therefore. For example, if a sensor of the vehicle 13 detects that the engine oil has not been changed within a predetermined time or period of vehicle 13 use, then the augmentation engine 71 may include recommendations for oil changing facilities. Similarly, if a fuel sensor indicates that the vehicle 13 is nearing an empty level of fuel, then the augmentation engine 71 may include gas stations as the functional recommendations 145. On the other hand, and as described above, sponsored content 127 related to the apparel 147 and dining 149 is introduced by the augmentation engine 71 based upon an agreement between an advertising party (i.e., the business selling the food or clothing) and a manufacturer, owner, or other party associated with the vehicle. The recommendations may be provided by the augmentation engine 71 interfacing with a mapping API as described below, where the augmentation engine 71 transmits the location of the vehicle 13 to the mapping API, along with a search query (i.e., "oil change facilities") and the mapping API will return the locations corresponding to the search query.

The augmentation engine 71 itself is depicted in the AI generated content 151 box of FIG. 7. This is because the augmentation engine 71 utilizes a neural network to generate the augmented reality content of the augmented image frame 55, thus making the augmented image frame 55 an example of AI generated content 151. As shown in FIG. 7, the augmented image frame 55 is displayed on a user's mobile device 39, which may be a smartphone, tablet, or mobile computing device as described herein. In addition to the various recommended content and sponsored content 127 described above, AI generated content 151 further includes a digitized twin vehicle 153 that is a digital counterpart of the vehicle 13. The appearance of the digitized twin vehicle 153 is determined according to the augmentation class selected by the user, such that the digitized twin vehicle 153 is a vehicle themed according to the user's preferences. A partial view, such as a view of the hood and front quarter panels of the digitized twin vehicle 153, may be introduced by the augmentation engine 71 into the augmented image frame 55 to replace the portions of the vehicle 13 appearing therein. This further increases the immersivity of the augmented image frame 55 by making it appear as if the user is driving the digitized twin vehicle 153, rather than the vehicle 13. Furthermore, if multiple users are in possession of vehicles 13 equipped with augmentation engines 71, then digitized twin vehicles 153 corresponding to individual users may be displayed in an augmented image frame 55 depicting a "metaverse" augmentation class.

To further aid in the immersivity of the "metaverse" class, or other augmentation classes as described herein, the augmentation engine 71 may further determine the velocity of the vehicle 13 in relation to a dynamic object, and adjusts the augmented image frame 55 accordingly. In particular, and by way of the navigation sensor 103 as described in relation to FIG. 4, the augmentation engine 71 is aware of the speed of the vehicle 13 as the vehicle 13 travels along the vehicle 13. Using various sensor fusion algorithms or similar conversion algorithms, the augmentation engine 71 is also configured to determine the velocity of dynamic objects, such as the school bus 139 or the traffic vehicle 41, from the image frames captured by the first sensor 15. For example, by comparing the pixel locations of the object in two separate environment image frames captured by the first sensor 15, the augmentation engine 71 determines whether the physical object is a dynamic object or a static object, and may determine that a dynamic object has traveled a particular distance based upon its change in location between captured image frames. In such cases, the augmentation engine 71 replicates the motion of the dynamic object by placing the digitized object at the new location of the dynamic object in the augmented image frame 55. The dynamic nature of the physical object may further be reflected by animating a portion or portions of the digitized object, such as causing a wheel of a digitized object to rotate about an axis in response to detecting that a traffic vehicle 41 has moved within the external environment. In this way, the augmentation engine 71 is configured to reflect both static and dynamic objects, and adjust the appearance of the digitized object when the physical object is determined to be a dynamic object.

Finally, FIG. 7 depicts methods of interfacing with the augmentation engine 71 as user interactions 155. The user interactions 155 may be captured by way of an infotainment module 19 as described above, and as further described in relation to FIG. 8. The user preferences are captured on a preference cache 77, which is formed as a dedicated storage device or a location on the memory 37 of the vehicle 13 or the server 29. From the preference cache 77, the user preferences are transmitted as user preference data 79 to the augmentation engine 71.

On the other hand, user interactions 155 further include a user traveling to a location presented by the augmentation engine 71. This may include, for example, a user traveling to a location 157 of a functional recommendation 145 or a location 157 of a business advertising sponsored content 127. The augmentation engine 71 is further configured, by way of the AR recommender sub-engine 89, to determine a trajectory 159 from a user's current position to the location 157. More specifically, the AR recommender sub-engine 89 may receive its location from the navigation sensor 103, and utilize a mapping API such as Google Maps, MapQuest Mapping API, or Microsoft Maps, for example, to determine a valid travel path from its current position to a desired location 157. The trajectory 159 may be displayed in the augmented image frame 55 by applying a filter 121 to the road 43 or a portion thereof, in order to highlight the correct travel path as the trajectory 159. Similarly, the trajectory 159 may be embodied by applying a filter 121 to display a green semitransparent arrow superimposed on the road 43 in the augmented image frame 55. This allows the user to be more easily apprised of direction instructions from the augmentation engine 71, as the user will see the trajectory 159 in the augmented image frame 55 on the windshield 57, rather than having to glance at an auxiliary device such as a dedicated GPS unit.

Figure 8:
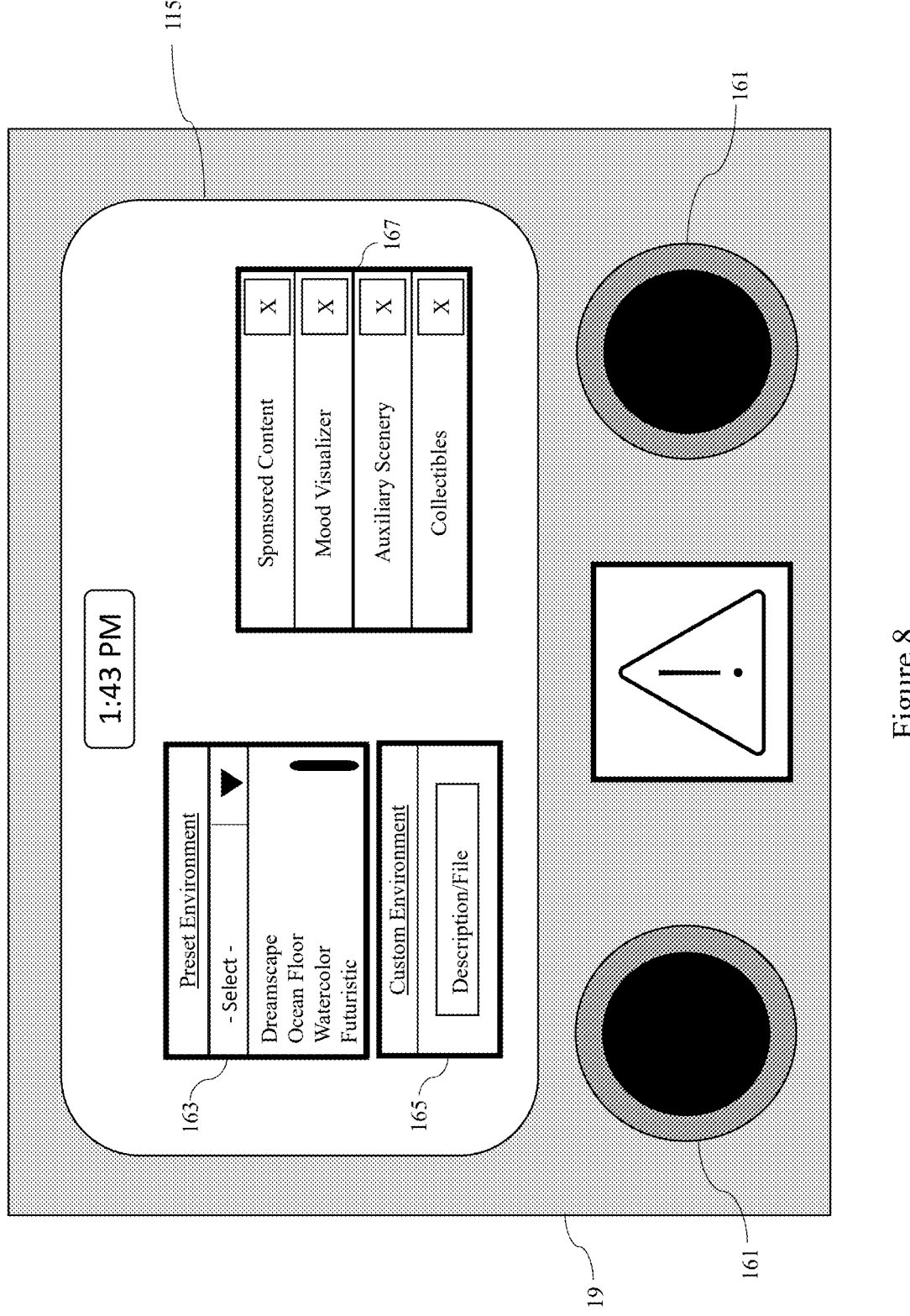
FIG. 8 depicts an infotainment module in accordance with one or more embodiments disclosed herein.

Turning to FIG. 8, FIG. 8 depicts one embodiment of an infotainment module 19 as described herein. As described above, the infotainment module 19 includes an interface 115, which is embodied as a touchscreen and includes a display such as an OLED or LCD panel and a capacitive or resistive touch layer. Thus, the user interacts with the infotainment module 19, and thus the vehicle 13, by touching graphical content depicted by the interface 115. In addition, the user may further interact with the infotainment module 19 by way of one or more selection dials 161, which are potentiometers that capture the rotation of a knob fixed thereto.

Continuing with FIG. 8, the content displayed by the interface 115 of the infotainment module 19 is a user preference menu, and includes elements such as an augmentation class menu 163, an input box 165, and a preference checkboxes 167. The augmentation class menu 163 is a drop-down menu that lists each type of augmentation class that may be selected by the user. For example, FIG. 8 depicts that a user may select a "dreamscape," "ocean floor," "watercolor," or "futuristic" augmentation class. Such augmentation classes are merely examples of types of classes that may be selected by a user, and other augmentation classes may be utilized by the augmentation engine 71 without departing from the nature of this specification. The selection of the augmentation class is transmitted to the augmentation engine 71 by way of the preference cache 77, and the augmentation engine 71 creates the augmented image frame 55 from the selected augmentation class as described above.

On the other hand, the input box 165 provides a way for the user to select a custom augmentation class. In particular, the input box 165 serves as a text or picture input location for a user to develop an augmentation class according to their desired driving environment. The input of the input box 165 is received by the augmentation engine 71 as the stylized image 81 depicted in FIG. 3. In the event that the user inputs text into the input box 165, the augmentation engine 71 may search an image database on the internet (e.g., Google Images, Getty Images, Shutterstock) by way of the transceiver 31 of the vehicle 13. The augmentation engine 71 then utilizes the first returned image from the database as the stylized image 81.

Furthermore, the input box 165 allows the user to describe a desired augmentation class and its associated objects with Boolean operators. For example, a user may wish to combine two augmentation classes, such as an "underwater" and a "watercolor" augmentation class to make an "underwater-watercolor" custom augmentation class. In this case, the user inputs the string "underwater AND watercolor" into the input box 165, where the capitalization of the word "AND" indicates that it is a Boolean operator. In such cases, the augmentation engine 71 determines the identity of a physical object in its surroundings, and searches its lookup table (i.e., Table 1) for a corresponding digital counterpart belonging to one of the desired augmentation classes, where the augmentation class is randomly selected. By randomly selecting the augmentation class for each object from the two augmentation classes selected by the user (i.e., the "underwater" and the "watercolor" augmentation classes), the resulting augmented image frame 55 is filled with objects from both classes, creating a customized augmented image frame 55.

Furthermore, a user may modify the objects modified in the augmented image frame 55 by the augmentation engine 71 with the Boolean operators. For example, a user may input a string of "watercolor NOT vehicles", which results in the augmented image frame 55 created by the augmentation engine 71 only modifying objects that are not identified as traffic vehicles 41 by the hidden layers 85. Thus, the input box 165 allows a user to further adapt the augmented image frame 55 developed by the augmentation engine 71 according to their desired preferences.

Finally, FIG. 8 depicts that the interface 115 displays preference checkboxes 167 to the user to interact with. The preference checkboxes 167 allow a user to select whether they want to enable or disable various features and options of the augmentation engine 71 described herein. For example, the preference checkboxes 167 include options such as enabling or disabling the introduction of the sponsored content 127, the mood visualizer (i.e., the filter 121), the auxiliary scenery 69, and collectibles 123 in the augmented image frame 55. In this way, the preference checkboxes 167 also allow a user to specifically tailor the augmented image frame 55 to their desired preferences, and the selection of the preference checkboxes 167 is transmitted to the augmentation engine 71 in the user preference data 79.

FIG. 9 depicts a method 900 for creating and displaying an augmented image frame 55. Steps of FIG. 9 may be performed by a system 11 as described herein, but are not limited thereto. Furthermore, the steps of FIG. 9 may be performed in any order, such that the steps are not limited to the sequence presented. In addition, multiple steps of FIG. 9 may be performed as a single action, or one step may comprise multiple actions by devices or components described herein.

The method 900 of FIG. 9 initiates at step 910, which includes capturing an environment image frame that includes a view of an external environment 49 of a vehicle 13. The environment image frame is captured by environment sensors 73 of the vehicle 13, which may include a camera and a LiDAR or radar unit, for example. Thus, the environment image frame also includes physical objects disposed in the vicinity of the vehicle, such as a traffic vehicle 41 and physical scenery 45. Once the environment image frame is captured by the environment sensors 73, the method proceeds to step 920.

In step 920, the augmentation engine 71 receives a desired augmentation class to be applied to the environment image frame from the user of the vehicle. This step is completed by the interface 115 of the infotainment module 19, which is embodied as a touchscreen that captures a user's touch. Thus, the reception of the augmentation class is embodied by the user touching the augmentation class menu 163 displayed on the infotainment module 19, which is transmitted to the augmentation engine 71 as user preference data 79. Once the interface 115 receives the desired augmentation class from the user, the method proceeds to step 930.

Step 930 includes an augmentation engine 71 receiving the environment image frame from the environment sensors 73 and the environmental data 75 from the interface 115. As described above, the augmentation engine 71 is a neural network that forms an augmented image frame 55 based upon the image frame in the environmental data 75. Thus, the environment image frame is transmitted to an augmentation engine 71 as environmental data 75, and is transmitted from the environment sensors 73 to the augmentation engine 71 by way of the data bus 23 and/or the transceiver 31. More specifically, if the augmentation engine 71 is housed locally on the memory 37 of the vehicle 13, then the environment image frame is transmitted to the memory 37 of the vehicle 13 by the data bus 23. On the other hand, if the augmentation engine 71 is housed on the server 29 then the environment image frame is transmitted to the server 29 by way of a wireless data connection 27 formed by transceivers 31 of the server 29 and the transceiver 31. The user preference data 79 is similarly transmitted from the infotainment module 19 to the augmentation engine 71 by way of the data bus 23 and/or the transceiver 31, and is stored on the preference cache 77 while not being used by the augmentation engine 71. Once the augmentation engine 71 possesses the environment image frame and the user preference data 79 including the augmentation class, the method proceeds to step 940.

In step 940, the augmentation engine 71 determines the location and identity of the physical object located in the environment image frame. As discussed above, this process is completed by the layers 83-87 of the augmentation engine 71, which develop a feature map and classify pixel groupings that correspond to the physical objects within the environment image frame using algorithms such as YOLO, SSD, or similar object detection algorithms. The location and identity of a physical object may be visually represented and output from the augmentation engine 71 as an annotated image 117, which is further depicted in FIG. 5C. Once the augmentation engine 71 has determined the identity and location of each object in the environment image frame, the method proceeds to step 950.

In step 950, the augmentation engine 71 retrieves a digital object associated with the identity of a physical object of the environment image frame and further associated with the selected augmentation class. Step 950 is completed by using a lookup function on a lookup table (e.g., Table 1) that includes a list of each augmentation class and various physical objects that may be present in the environment image frame. For example, if the augmentation engine 71 receives the identity of a physical object as a "tree" and receives an augmentation class that is "watercolor", the augmentation engine 71 will search the lookup table for a "watercolor" augmentation class row, and search the row for a cell associated with a digitized version of a "tree", which is reflected in FIG. 5D as digital scenery 59. In this way, the augmentation engine 71 is configured to iteratively determine digital objects for each of the physical objects in the environment image frame. Once every object detected in the environment image frame has been assigned a digital object associated with the augmentation class, the method proceeds to step 960.

In step 960, the augmentation engine 71 renders the augmented image frame 55. The augmented image frame 55 includes the digital objects in lieu of the physical objects, which is enabled by replacing the colors of a physical object with the colors of the digital object in the bitmap of the environment image frame. Thus, the augmented image frame 55 does not include the physical object, and instead includes a digital object disposed in the augmented image frame 55 at a same location as the location of the physical object in the environment image frame. The augmented image frame 55 is specifically created by the rendering sub-engine 93 of the augmentation engine 71 as described above, and once the augmented image frame 55 is rendered the method proceeds to step 970.

Finally, in step 970, the augmented image frame 55 is depicted to a user of the system 11. Step 970 may be performed in multiple ways, depending on the configuration of the system 11. For example, if the system 11 includes a mobile device 39 connected to the vehicle 13 by a wireless data connection 27, then the augmented image frame 55 is displayed on an interface 115 of the mobile device 39. In addition, or alternatively, the augmented image frame 55 may be displayed on a windshield 57 of a vehicle 13 by way of a projection unit 53, or displayed on the interface 115 of the infotainment module 19 such that the augmented image frame 55 is presented in the vehicle 13. Thus, the method 900 concludes with the augmented image frame 55 being displayed to the user or users, at which point the method repeats to create a subsequent augmented image frame 55. By forming and displaying a series of augmented image frame 55 in rapid succession, the system 11 is capable of creating an augmented video feed, such that the user is presented with an aesthetically appealing synthetic view of the external environment displayed on the windshield 57 or the mobile device 39, for example.

Although only a few example embodiments have been described in detail above, those skilled in the art will readily appreciate that many modifications are possible in the example embodiments without materially departing from this invention. For example, the system may be restricted to vary the appearance of only a specific type of object in the surrounding environment (i.e., only modify appearance of traffic vehicles, and not the appearance of physical scenery), in order to reduce processing demands of the augmentation engine. Furthermore, different devices within the system may display different augmentation classes from each other, such that a passenger with a mobile device may see a different augmented image frame than a driver of the vehicle viewing the augmented image frame on the windshield. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A system for rendering an augmented image frame, the system comprising:

a first sensor configured to capture an environment image frame that includes a view comprising a physical object disposed in an external environment of a vehicle;

an interface configured to receive, from a user of the vehicle, an augmentation class to be applied to the environment image frame;

a memory configured to store an augmentation engine comprising computer readable code;

a processor configured to execute the computer readable code forming the augmentation engine, where the computer readable code causes the processor to:

receive the environment image frame and the augmentation class to be applied to the environment image frame;

determine an identity and a location of the physical object disposed in the environment image frame;

retrieve a digital object associated with the identity of the physical object and further associated with the augmentation class; and render the augmented image frame such that the augmented image frame includes the digital object and the external environment of the vehicle, without the physical object, where the digital object is disposed in the augmented image frame at a same location as the location of the physical object in the environment image frame; and a display configured to depict the augmented image frame to the user such that the user is presented with an aesthetically appealing synthetic view of the external environment, wherein the augmentation class comprises a metaverse, and the metaverse comprises a digital universe controlled by physical entities and corporations, and wherein the metaverse includes digitized representations of the physical entities and the corporations.

2. The system of claim 1, wherein the augmentation engine further comprises instructions causing the processor to apply a filter while rendering the augmented image frame, where the filter comprises a modification to a saturation, hue, or light intensity of at least a portion of the augmented image frame.

3. The system of claim 1, wherein the augmentation engine is configured to determine whether the physical object is a static object or a dynamic object, and adjust an appearance of the digital object when the physical object is a dynamic object.

4. The system of claim 1, wherein the augmentation engine further comprises instructions causing the processor to introduce auxiliary scenery into the augmented image frame, where the auxiliary scenery comprises one or more digital objects associated with the augmentation class.

5. The system of claim 1, wherein the memory is configured to store a plurality of augmentation classes, where each augmentation class of the plurality of augmentation classes comprises a unique cinematic theme to be applied to the environment image frame.

6. The system of claim 1, wherein the display comprises a windshield and a projection unit of the vehicle, an infotainment module of the vehicle, or a mobile device belonging to the user of the vehicle.

7. The system of claim 1, wherein the augmentation engine is configured to modify a shading of the digital object to correspond to a shading of the physical object such that the digital object is depicted as a three dimensional object to the user.

8. The system of claim 1, wherein the physical object comprises: a traffic vehicle, physical scenery located in the external environment, or a sign comprising information related to the external environment.

9. The system of claim 1, wherein the digital object is retrieved from a stylized image that is input into the augmentation engine.

10. The system of claim 1, wherein the augmentation engine is configured to receive the augmentation class by way of an input box presented to the user.

11. The system of claim 1, wherein the augmentation engine further comprises instructions causing the processor to introduce sponsored content into the augmented image frame.

12. The system of claim 11, wherein the sponsored content introduced into the augmented image frame is selected by the processor according to a user preference stored on the memory, and the sponsored content is associated with an identified object of the environment image frame.

13. The system of claim 11, wherein the sponsored content introduced into the augmented image frame comprises a text description or graphical depiction of information related to an attraction located in the external environment of the vehicle.

14. A method for generating an augmented image frame, the method comprising:

capturing an environment image frame that includes a view comprising a physical object disposed in an external environment of a vehicle;

receiving, from a user of the vehicle, an augmentation class to be applied to the environment image frame;

storing an augmentation engine comprising computer readable code on a memory;

receiving, by executing the computer readable code that forms the augmentation engine, the environment image frame and the augmentation class to be applied to the environment image frame;

determining, with the augmentation engine, an identity and a location of the physical object disposed in the environment image frame;

retrieving, with the augmentation engine, a digital object associated with the identity of the physical object and further associated with the augmentation class;

rendering the augmented image frame with the augmentation engine such that the augmented image frame includes the digital object and the external environment of the vehicle, without the physical object, where the digital object is disposed in the augmented image frame at a same location as the location of the physical object in the environment image frame; and depicting the augmented image frame to the user such that the user is presented with an aesthetically appealing synthetic view of the external environment, wherein the augmentation class comprises a metaverse, and the metaverse comprises a digital universe controlled by physical entities and corporations, and wherein the metaverse includes digitized representations of the physical entities and the corporations.

15. The method of claim 14, further comprising: applying a filter with the augmentation engine while rendering the augmented image frame, where the filter comprises a modification to a saturation, hue, or light intensity of at least a portion of the augmented image frame.

16. The method of claim 15, further comprising: selecting the filter with the augmentation engine based upon the augmentation class received from the user.

17. The method of claim 14, further comprising: introducing auxiliary scenery into the augmented image frame, where the auxiliary scenery comprises one or more digital objects associated with the augmentation class.

18. The method of claim 14, further comprising: storing a plurality of augmentation classes on the memory, where each augmentation class of the plurality of augmentation classes comprises a unique cinematic theme to be applied to the environment image frame.

19. The method of claim 14, further comprising: retrieving the digital object from a stylized image that is input into the augmentation engine.

20. The method of claim 14, further comprising: receiving the augmentation class, with the augmentation engine, by way of an input box presented to the user.

* * * * *